United States Patent
Shahidzadeh et al.

(10) Patent No.: US 11,329,998 B1
(45) Date of Patent: May 10, 2022

(54) IDENTIFICATION (ID) PROOFING AND RISK ENGINE INTEGRATION SYSTEM AND METHOD

(71) Applicant: Acceptto Corporation, Portland, OR (US)

(72) Inventors: Shahrokh Shahidzadeh, Portland, OR (US); Frank Stefan Ulbrich, Karlsruhe (DE)

(73) Assignee: SecureAuth Corporation, Irvine, CA (US)

( * ) Notice: Subject to any disclaimer, the term of this patent is extended or adjusted under 35 U.S.C. 154(b) by 0 days.

(21) Appl. No.: 17/460,435

(22) Filed: Aug. 30, 2021

Related U.S. Application Data

(60) Provisional application No. 63/072,900, filed on Aug. 31, 2020.

(51) Int. Cl.
  *H04L 9/40* (2022.01)
  *H04L 29/06* (2006.01)
  *G06F 21/57* (2013.01)

(52) U.S. Cl.
  CPC ............ *H04L 63/126* (2013.01); *G06F 21/57* (2013.01); *H04L 63/08* (2013.01); *G06F 2221/2115* (2013.01)

(58) Field of Classification Search
  CPC ......... H04L 63/126; H04L 63/08; H04L 9/32; G06F 21/57; G06F 2221/2115
  See application file for complete search history.

(56) References Cited

U.S. PATENT DOCUMENTS

| | | | |
|---|---|---|---|
| 2,146,842 A | | 2/1939 | Niessen |
| 5,903,882 A | | 5/1999 | Asay |
| 6,100,885 A | * | 8/2000 | Donnelly .................. G06F 8/38 715/762 |
| 6,636,721 B2 | | 10/2003 | Threadgill |
| 6,850,497 B1 | | 2/2005 | Sigler |
| 7,243,369 B2 | | 7/2007 | Bhat |
| 7,260,734 B2 | | 8/2007 | Dickinson |
| 7,395,435 B2 | | 7/2008 | Benhammou |
| 7,584,152 B2 | | 9/2009 | Gupta |
| 7,698,398 B1 | | 4/2010 | Lai |
| 7,721,322 B2 | | 4/2010 | Sastry |
| 7,962,419 B2 | | 6/2011 | Gupta |
| 7,971,062 B1 | | 6/2011 | Hughes et al. |
| 8,127,142 B2 | | 2/2012 | Cuppett |
| 8,127,982 B1 | | 3/2012 | Casey |

(Continued)

OTHER PUBLICATIONS

Masaki Shimaoka et al., "Modeling the Cost Stgructure of Identity Proofing," 2014, pp. 180-185 (Year: 2014).*

(Continued)

*Primary Examiner* — Luu T Pham
*Assistant Examiner* — Canh Le
(74) *Attorney, Agent, or Firm* — Roark IP

(57) ABSTRACT

The system and method disclosed performs entity authentication through identification proofing. A relying party such as a corporation or other type of entity having a secure website, computer network and secure facility working a risk engine can determine the authenticity, validation and verification during registration of a user entity. The identification proofing is integrated with a risk engine. The risk engine is capable of using bio-behavior based information which may be continuously monitored.

7 Claims, 7 Drawing Sheets

(56) References Cited

U.S. PATENT DOCUMENTS

| | | |
|---|---|---|
| 8,205,249 B2 | 6/2012 | Meister |
| 8,261,089 B2 | 9/2012 | Cobos |
| 8,346,924 B1 | 1/2013 | Bucher et al. |
| 8,423,476 B2 | 4/2013 | Bishop |
| 8,457,781 B2 | 6/2013 | Bailey |
| 8,510,797 B2 | 8/2013 | Kasturi |
| 8,510,811 B2 | 8/2013 | Kuang et al. |
| 8,516,542 B1 | 8/2013 | Lerner |
| 8,572,714 B2 | 10/2013 | Radhakrishnan |
| 8,612,357 B2 | 12/2013 | Phillips |
| 8,615,562 B1 | 12/2013 | Huang |
| 8,661,254 B1 | 2/2014 | Sama |
| 8,756,661 B1 | 6/2014 | Levenberg |
| 8,776,204 B2 | 7/2014 | Faynberg |
| 8,831,677 B2 | 9/2014 | Villa-Real |
| 8,832,857 B2 | 9/2014 | Court |
| 8,843,997 B1 | 9/2014 | Hare |
| 8,869,241 B2 | 10/2014 | Davis |
| 8,904,494 B2 | 12/2014 | Kindler |
| 9,077,758 B1 | 7/2015 | McGovern |
| 9,183,560 B2 | 11/2015 | Abelow |
| 9,374,369 B2 | 6/2016 | Mahaffey |
| 9,391,779 B2 | 7/2016 | Bair |
| 9,419,951 B1 | 8/2016 | Feisher |
| 9,426,183 B2 | 8/2016 | Shahidzadeh |
| 9,444,824 B1 | 9/2016 | Balazs |
| 9,503,452 B1 | 11/2016 | Kumar |
| 9,510,320 B2 | 11/2016 | Reed |
| 9,602,508 B1 | 3/2017 | Mahaffey |
| 9,613,257 B2 | 4/2017 | Phillips |
| 9,614,828 B1 | 4/2017 | Golwalkar |
| 9,639,689 B1 | 5/2017 | Herskovic |
| 9,742,809 B1 | 8/2017 | Shahidzadeh |
| 10,148,699 B1 | 12/2018 | Shahidzadeh |
| 10,325,259 B1 | 6/2019 | Shahidzadeh |
| 10,387,980 B1 | 8/2019 | Shahidzadeh |
| 10,511,590 B1 | 12/2019 | Bosch |
| 10,572,874 B1 | 2/2020 | Shahidzadeh |
| 10,693,661 B1 | 6/2020 | Hamlet |
| 10,715,555 B1 | 7/2020 | Shahidzadeh |
| 10,742,647 B2 | 8/2020 | Crabtree |
| 10,824,702 B1 | 11/2020 | Shahidzadeh |
| 10,904,240 B2 | 1/2021 | Bosch |
| 10,922,631 B1 | 2/2021 | Shahidzadeh |
| 2003/0061111 A1 | 3/2003 | Dutta |
| 2003/0115142 A1 | 6/2003 | Brickell |
| 2004/0155101 A1 | 8/2004 | Royer |
| 2005/0044197 A1 | 2/2005 | Lai |
| 2005/0060584 A1 | 3/2005 | Ginter |
| 2005/0102530 A1 | 5/2005 | Burrows |
| 2006/0143231 A1 | 6/2006 | Boccasam |
| 2007/0011066 A1 | 1/2007 | Steeves |
| 2007/0033136 A1 | 2/2007 | Hu |
| 2007/0118891 A1 | 5/2007 | Buer |
| 2007/0156611 A1 | 7/2007 | Gupta |
| 2007/0262136 A1 | 11/2007 | Ou |
| 2008/0101283 A1 | 5/2008 | Calhoun |
| 2008/0196088 A1 | 8/2008 | Vinokurov |
| 2008/0222283 A1 | 9/2008 | Ertugral |
| 2009/0006230 A1 | 1/2009 | Lyda |
| 2009/0077163 A1 | 3/2009 | Ertugral |
| 2009/0097661 A1 | 4/2009 | Orsini |
| 2009/0132808 A1 | 5/2009 | Baentsch |
| 2009/0259838 A1 | 10/2009 | Lin |
| 2009/0271847 A1 | 10/2009 | Karjala |
| 2009/0292927 A1 | 11/2009 | Wenzel |
| 2009/0307135 A1 | 12/2009 | Gupta |
| 2010/0199089 A1 | 8/2010 | Vysogorets |
| 2010/0228996 A1 | 9/2010 | Ginter |
| 2011/0035788 A1 | 2/2011 | White |
| 2011/0086612 A1 | 4/2011 | Montz |
| 2011/0093927 A1 | 4/2011 | Leppanen |
| 2011/0103265 A1 | 5/2011 | Dilipkumar Saklikar |
| 2011/0173017 A1 | 7/2011 | Salonen |
| 2011/0173448 A1 | 7/2011 | Baentsch |
| 2011/0204142 A1 | 8/2011 | Rao |
| 2011/0209200 A2 | 8/2011 | White |
| 2011/0244798 A1* | 10/2011 | Daigle ............ H04L 67/12 455/41.2 |
| 2011/0288996 A1 | 11/2011 | Kreutz |
| 2011/0296513 A1 | 12/2011 | Kasad |
| 2011/0307949 A1 | 12/2011 | Ronda |
| 2012/0117157 A1 | 5/2012 | Ristock |
| 2012/0159177 A1 | 6/2012 | Bajaj |
| 2012/0185547 A1* | 7/2012 | Hugg ............ G06F 3/04883 709/206 |
| 2012/0192260 A1 | 7/2012 | Kontsevich |
| 2012/0216244 A1 | 8/2012 | Kumar |
| 2012/0330788 A1 | 12/2012 | Hanson |
| 2013/0007849 A1 | 1/2013 | Coulter |
| 2013/0047202 A1 | 2/2013 | Radhakrishnan |
| 2013/0047213 A1 | 2/2013 | Radhakrishnan |
| 2013/0078976 A1* | 3/2013 | Naftolin ............ H04M 1/72454 455/418 |
| 2013/0111549 A1 | 5/2013 | Sowatskey |
| 2013/0125226 A1 | 5/2013 | Shah |
| 2013/0174241 A1 | 7/2013 | Cha |
| 2013/0185205 A1 | 7/2013 | Boss |
| 2013/0204708 A1* | 8/2013 | Ramachandran ... G06F 21/6254 705/14.66 |
| 2013/0205133 A1 | 8/2013 | Hess |
| 2013/0298242 A1 | 11/2013 | Kumar |
| 2013/0305322 A1 | 11/2013 | Raleigh |
| 2014/0040975 A1 | 2/2014 | Raleigh |
| 2014/0079223 A1* | 3/2014 | Nguyen ............ G01S 5/26 381/18 |
| 2014/0172693 A1* | 6/2014 | Kanjlia ............ G07F 19/206 705/39 |
| 2014/0189808 A1 | 7/2014 | Gupta |
| 2014/0189809 A1 | 7/2014 | Koved |
| 2014/0189827 A1 | 7/2014 | Popovich |
| 2014/0189834 A1 | 7/2014 | Metke |
| 2014/0189840 A1 | 7/2014 | Metke |
| 2014/0247155 A1 | 9/2014 | Proud |
| 2014/0282877 A1 | 9/2014 | Mahaffey |
| 2014/0304795 A1 | 10/2014 | Bruno |
| 2015/0058931 A1 | 2/2015 | Miu |
| 2015/0121462 A1 | 4/2015 | Courage |
| 2016/0005044 A1 | 1/2016 | Moss |
| 2016/0055690 A1 | 2/2016 | Raina |
| 2016/0087957 A1 | 3/2016 | Shah |
| 2016/0112397 A1 | 4/2016 | Mankovskii |
| 2016/0119323 A1 | 4/2016 | Krishna |
| 2016/0189150 A1 | 6/2016 | Ahuja |
| 2016/0337863 A1 | 11/2016 | Robinson |
| 2016/0366120 A1 | 12/2016 | Rykowski |
| 2016/0366121 A1 | 12/2016 | Rykowski |
| 2017/0032113 A1 | 2/2017 | Tunnell |
| 2017/0034183 A1 | 2/2017 | Enqvist |
| 2017/0126660 A1 | 5/2017 | Brannon |
| 2017/0126661 A1 | 5/2017 | Brannon |
| 2017/0155640 A1 | 6/2017 | Rykowski |
| 2017/0339176 A1 | 11/2017 | Backer |
| 2017/0357917 A1 | 12/2017 | Holmes |
| 2017/0372055 A1 | 12/2017 | Robinson |
| 2018/0012003 A1* | 1/2018 | Asulin ............ G06F 21/316 |
| 2018/0131685 A1 | 5/2018 | Sridhar |
| 2018/0145968 A1 | 5/2018 | Rykowski |
| 2018/0152439 A1 | 5/2018 | Hande |
| 2018/0262484 A1 | 9/2018 | Kesari |
| 2018/0276572 A1 | 9/2018 | Otillar |
| 2018/0316657 A1 | 11/2018 | Hardt |
| 2018/0367526 A1 | 12/2018 | Huang |
| 2019/0028803 A1* | 1/2019 | Benattar ............ H04R 1/406 |
| 2019/0068578 A1 | 2/2019 | Balakrishnan |
| 2019/0286806 A1 | 9/2019 | Robinson |
| 2019/0313967 A1* | 10/2019 | Lee ............ A61B 5/4836 |
| 2019/0332790 A1 | 10/2019 | Kukehalli Subramanya |
| 2019/0378394 A1* | 12/2019 | Kawese ............ H04L 12/66 |
| 2020/0026834 A1 | 1/2020 | Vimadalal et al. |
| 2020/0042723 A1* | 2/2020 | Krishnamoorthy ..... G06F 21/40 |
| 2020/0043118 A1 | 2/2020 | Sakaguchi |
| 2020/0118131 A1 | 4/2020 | Diriye |
| 2020/0175434 A1 | 6/2020 | Wisniewski |

(56) References Cited

U.S. PATENT DOCUMENTS

| | | |
|---|---|---|
| 2020/0177386 A1 | 6/2020 | Mahmood |
| 2020/0242222 A1* | 7/2020 | Machani ................ G06F 21/45 |
| 2020/0252374 A1 | 8/2020 | Bosch |
| 2020/0349247 A1 | 11/2020 | Seo |
| 2021/0133750 A1* | 5/2021 | Leddy, III .......... G06Q 20/3227 |
| 2021/0176066 A1* | 6/2021 | Keith, Jr. ........... G06K 9/00087 |

OTHER PUBLICATIONS

Dieter Gollmann, "What do we mean by Entity Authentication?", 1996, pp. 46-54. (Year: 1996).*

Khanna, Tarun. "Contextual Intelligence", Harvard Business Review, Sep. 2014.

Smart, M.B. "Improving Remote Identity Authentication For Consumers and Financial Institutions", Order No. 10245677, ProQuest, 2016.

* cited by examiner

IDENTIFICATION (ID) PROOFING AND RISK ENGINE INTEGRATION SYSTEM AND METHOD

PRIORITY

This application claims priority to U.S. Patent Provisional Application No. 63/072,900, filed Aug. 31, 2020; which is hereby incorporated by reference in its entirety.

TECHNICAL FIELD

The subject matter disclosed herein generally relates to entity authentication through identification proofing.

BACKGROUND

Digital transactions of a variety of types may stem not from a party authorized to enter into the transaction but by parties that are either unauthorized to enter into the transaction or bad actors and network bots who have acquired the means to enter into the transaction illegally from a hostile environment. The hostile environment that may have resulted from a Denial of Service (DoS) attack from sources such as User Datagram Protocol (UDP) flooding, Internet Control Message Protocol (ICMP) flooding, and/or Portscan. For instance, a stolen credit card number or bank account access may be utilized to make fraudulent purchases or transactions-exchanges. A stolen or compromised password may be utilized to improperly access information. Even conventional purchases or activities within an organization may be engaged in by an employee or member who does not have authorization to do so.

SUMMARY OF THE INVENTION

Aspects of the disclosure include a system for identity proofing a user entity for allowing for secure access comprising: a first plurality of processors having artificial intelligence machine learning (AI/ML) capabilities forming a smart data hub and a second plurality of processors forming a risk engine, wherein both the smart data hub and risk engine are coupled to a network interface, the first and second plurality of processors configured to: in a resolution step, capture registration information of the user entity at a relying party and monitor the user entity by the risk engine during an active session; in a first part of a validation step, the risk engine determines whether the user entity is not a threat actor by reviewing a plurality of egocentric and allocentric factors and if an abnormality is detected, notifying the relying party to terminate the active session; in a second part of a validation step, the risk engine reviews evidence submitted by the user entity and compares the evidence to an internal database to determine whether the owner of the identity is the user entity and whether the user entity is a new or a claimed registered identity; in a verification step, if the user entity is new, the user entity obtains contact information from at least one of a plurality of third parties and contacts the user entity to obtain a confirmation that the user entity is attempting to register with the relying party and if the user entity is not new, the risk engine already has the contact information for the user entity and contacts the user entity directly through a predetermined out of band method; and send a risk score from the risk engine to the relying party a classification of the risk determining that the user entity is or is not a threat actor.

Aspects of the disclosure further include a method for identity proofing a user entity for allowing for secure access comprising: in a resolution step, capture registration information of the user entity at a relying party and monitor the user entity by the risk engine during an active session; in a first part of a validation step, the risk engine determines whether the user entity is not a threat actor by reviewing a plurality of egocentric and allocentric factors and if an abnormality is detected, notifying the relying party to terminate the active session; in a second part of a validation step, the risk engine reviews evidence submitted by the user entity and compares the evidence to an internal database to determine whether the owner of the identity is the user entity and whether the user entity is a new or a claimed registered identity; in a verification step, if the user entity is new, the user entity obtains contact information from at least one of a plurality of third parties and contacts the user entity to obtain a confirmation that the user entity is attempting to register with the relying party and if the user entity is not new, the risk engine already has the contact information for the user entity and contacts the user entity directly through a predetermined out of band method; and send a risk score from the risk engine to the relying party a classification of the risk determining that the user entity is or is not a threat actor.

BRIEF DESCRIPTION OF THE DRAWINGS

The embodiments are illustrated by way of example and not limitation in the figures of the accompanying drawings.

In FIG. 5, browser and device inference is made in which user entity 102 behavior information, browser, and user entity device 104 and client device 106 attributes are collected by the smart data hub 108 and risk engine 110.

DETAILED DESCRIPTION

Figure 1:
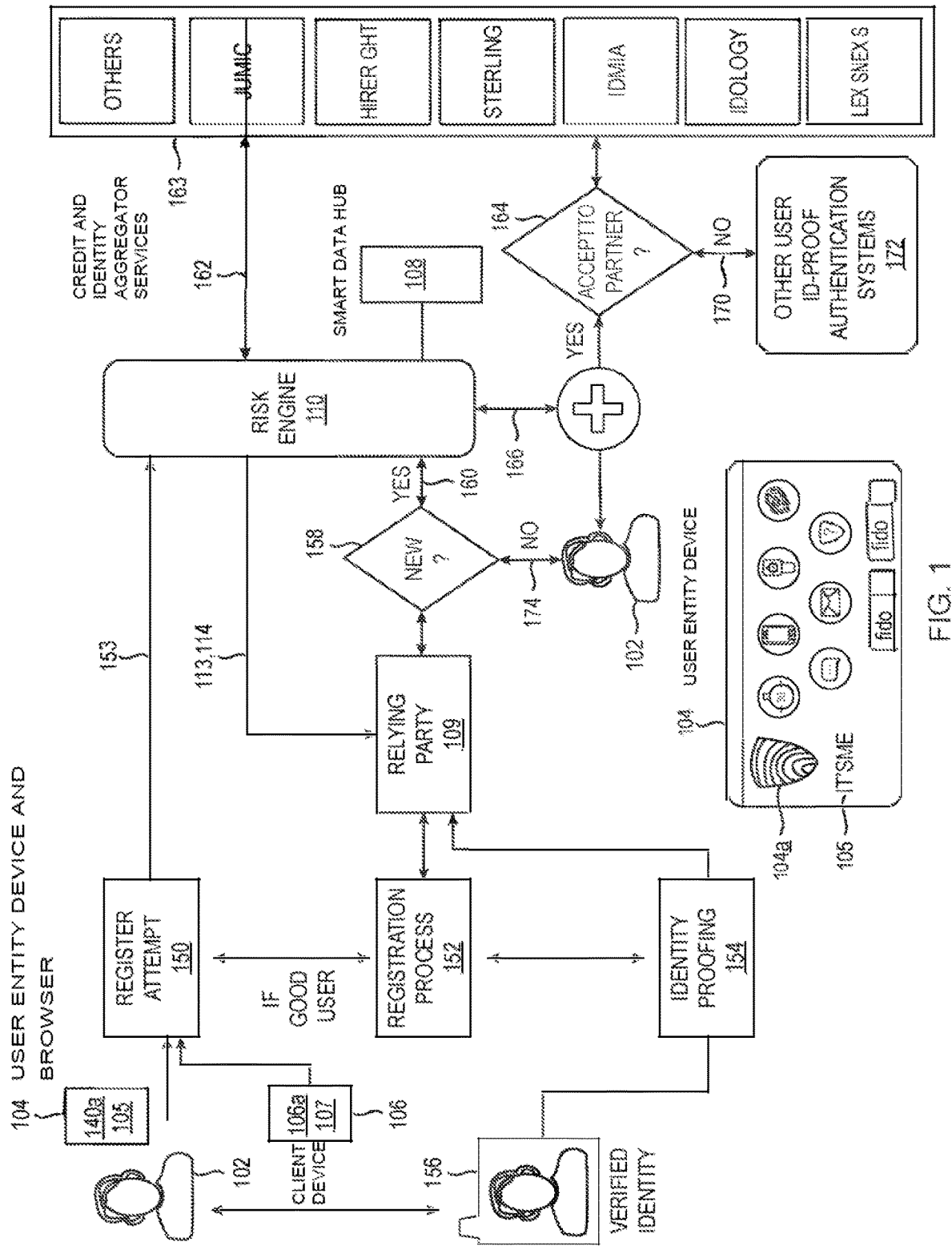
FIG. 1 shows a schematic of a view of the identification proofing system and method 100.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims. Below are example definitions that are provided only for illustrative purposes in this disclosure and should not be construed to limit the scope of the embodiments disclosed herein in any manner. Some terms are defined below for clarity purposes. These terms are not rigidly restricted to these definitions. These terms and other terms may also be defined by their use in the context of this description.

Acceptto Identity Trust Services's (AITS) ClientTrust Application Programming Interface (API): allows a relying party (RPs) 109 (defined below) to query if a claimed identity (the identity of the user entity 102 who is making an attempt to login to a relying party 109 or access a physical location) is connected and determine if authentication and access request associated with claimed identity can be trusted. The API provides a level of assurance and contextual and behavior data associated with an online user entity 102 or physically present at a location. If the AITS API indicates that the claimed identity cannot be confirmed online or in person and has a low level of assurance score (or, correspondingly, a high risk score), then an appropriate action such as access decline or step up authentication is enforced.

Active Session: the duration of which a user entity 102 attempts to access a relying party (RP) 109 services, application or physical location. Also, an active session can be both the access attempt and the user entity device 104 and/or client device 106 session when validly accessed.

Allocentric: in the context of an authentication, a transaction or bio-behavior modeling, it is the other user entities 102, user entity devices 104, applications (104a, 106a) and/or transactions within the overall identification proofing system and method 100 in which access, transaction and bio-behavior modeling of interest are observed and not necessarily binded to the actual user entity 102 of interest access or transaction but the concurrent access or transaction present in the system 100. Good examples are observation of the traffic in a location or in a system independent of the initiated access or transaction by the user entity 102 of interest but other user entities 102 which impact the system location based services, load, traffic, applications and microservices usage graphs and hence indirectly impacting the current access, transaction and event of interest. The current access, transaction, or event of interest may be a physical presence, proximity in time and/or location, contact, Transmission Control Protocol (TCP) synchronize (SYN), Internet Control Message Protocol (ICMP) and user entity datagram protocol (UDP) flooding, port scanning, the payload signature of the system, number of transactions, data fingerprint, data consumptions, common internet protocols (IPs), and abnormal versus normal behaviors of transactions other than current subject and context of interest. Allocentric may be compared to egocentric defined below which looks at only the user entity 102 relationship with the ambient environment, network 112 and system and method 100.

Application: software used on a computer (usually by a user entity device 104 and/or client device 106) and can be applications (104a, 106a) that are targeted or supported by specific classes of machine, such as a mobile application, desktop application, tablet application, and/or enterprise application (e.g., user entity device application(s) 104a on user entity device 104, client device application(s) 106a on a client device 106). Applications may be separated into applications which reside on devices 104 or 106 (e.g., VPN, PowerPoint, Excel) and cloud applications which may reside in the cloud (e.g., Gmail, GitHub). Cloud applications may correspond to applications on the device (104, 106 or may be other types such as social media applications (e.g., Facebook).

Application Identity Information: means, for a website, mobile (104a) or desktop (106a) application, or other service needing authentication or authorization, the Application Identity Information may be a uniform resource locator (URL), package name of a hosting application, signing certificate of hosting application, class name or other identifier of current user interface (UI) dialog, a universally unique identifier (UUID), a hash of the application or site code, a digital signature or key-hashing for message authentication (HMAC) provided by the application, or other information that can be used to fingerprint software (e.g., class name of running service or activity).

Artificial Intelligence: computer system(s) able to perform tasks that normally require human intelligence, such as visual perception, speech recognition, decision-making, risk assessment, and translation between languages. Machine learning is a subset of artificial intelligence.

Attributes: unique identification information associated with a user entity 102, user entity device 104 and/or client device 106 such as biometric information, habits, spatiotemporal data, location, behavior, browser and/or network 112 context. Habits of the user entity 102 may be both physical and logical including applications used (104a, 106a) and data usages.

Audit Log: a standard for message logging which allows separation of the software that generates messages, the system that stores them, and the software that reports and analyzes them.

Authentication Assurance: the degree of confidence reached in the authentication process that the communication partner (human or machine) is the user entity 102 that it claims to be or is expected to be. The confidence may be based on the degree of confidence in the binding between the communicating user entity device 104 (or client device 106) and the user entity 102 identity that is presented.

Authorization: an indication (e.g., yes/no, true/false) of whether the access or transaction is allowed or a token that grants access or is proof of allowance of an access, and which can be provided to identification proofing system and method 100 which requires proof that a given user entity 102 is authorized for a particular action or a callback to the identification proofing system and method 100 indicating that the user entity 102 is authorized.

Biobehavioral Derived Credential: a derived credential that is drawn from a combination of human biological features, behavioral activities and digital-logical habits of the claimed identity of a digital consumer such as a user entity 102.

Claimed Identity: until verified any presented credential such as user entity 102 identity and credentials such as a password or other methods are classified as claimed identity (versus confirmed identity which is a post successful authentication).

Computer (e.g., user entity device 104, client device 106, smart data hub 108, risk engine 110, replying party server 109): may refer to a single computer or to a system of interacting computers. A computer is a combination of a hardware system, a software operating system and perhaps one or more software application programs. Examples of a computer include without limitation a laptop computer, a palmtop computer, a smart phone, a cell phone, a mobile phone, an IBM-type personal computer (PC) having an operating system such as Microsoft Windows®, an Apple® computer having an operating system such as MAC-OS, a server, hardware having a JAVA-OS operating system, and a Sun Microsystems Workstation having a UNIX operating system.

Contextual Identifiers (or Contextual Factors): may be part of the verification process of a user entity 102 and/or client device 106 and may include the following multi-factors used singularly or in different combinations: location, biometrics (e.g., heartbeat monitoring, iris recognition, fingerprint, voice analysis, and deoxyribonucleic acid (DNA) testing), user entity 102 habits, user entity 102 location, spatial information, user entity 102 body embedded devices, smart tattoos, dashboard of the user entity 102 car, the user entity 102 television (TV), the user entity 102 home security digital fingerprint, user entity 102 facial recognition (e.g., faceprint), Domain Name System (DNS), type of user entity device 104, type of client device 106, user entity device browser 105 context (e.g., version number), client device browser 107 context, network 112 context, remote access Virtual Private Network (VPN), user entity device application 104*a* usage and habits client device application 106*a* usage and habits, data sharing, and access fingerprints.

Credentials: may take several forms, including but not limited to: (a) personally identifiable user entity 102 information such as name, address, and/or birthdate; (b) an identity proxy such a user entity 102 name, login identifier (e.g., user entity name), or email address; (c) biometric identifiers such as fingerprint, voice, or face; (d) an X.509 digital certificate; (e) a digital fingerprint and approval from a binded user entity device 104 or client device 106; (f) behavioral habits of a user entity 102, user entity device 104 or client device 106 in physical or cyber space; and/or (g) behavior of network 112 and applications 104*a*, 106*a* at the time of user entity device 104 interface with the application and network 112. The term "credential" or "credentials" means something that is provided as a correct response to a given authorization challenge, such as a user entity 102 name, password, token, or similar data element or object as described in more detail in the description that follows.

Device: means hardware, software or a combination thereof. A device may sometimes be referred to as an apparatus. Each device is configured to carry out one or more steps of the identification proofing system and method 100 described herein and may be used for large-scale behavioral targeting.

Egocentric (as opposed to Allocentric discussed above): in the context of both cyber and physical transactions is the relation of user entity 102, user entity device 104, client device 106 and/or an application (104*a*, 106*a*) used by or on these devices to the overall identification proofing system and method 100. In an egocentric analysis, context may be a physical location of the user entity 102, a network 112 attributed, overall traffic on the network 112, a data signature and/or transactions relative to each of the user entity device 104 and client device 106. Egocentric may be seen as a one to one relationship of subject user entity 102 with environmental objects.

Engine: the term "engine" is used herein to indicate software components an order of magnitude more complex than ordinary modules of software (such as libraries, software development kits (SDKs), or objects). Examples of software engines include relational database engines, workflow engines, inference engines, and search engines. A common characteristic of software engines is metadata that provides models of the real data that the engine processes. Software modules pass data to the engine and the engine uses its metadata models to transform the data into a different state.

Fingerprints: collection of attributes that help identify the authentic user entity 102, user entity device 104 and/or client device 106.

Friction (or security friction): any circumstance whereby a primary task is prevented or delayed due to a security requirement.

Heartbeat: when the user entity device 104 or client device 106 send regular reports on their security status to a monitoring computer to determine whether the user entity 102 is still on the network 112, is valid and should still allowed to be on the network 112.

Identity Assurance: the degree of confidence in the process of identity validation and verification used to establish the identity of the user entity 102 to which the credential was issued and the degree of confidence that the user entity 102 that uses the credential is that user entity 102 or the user entity 102 to which the credential was issued or assigned.

Level of Assurance (LOA): a level of confidence for identity proofing with respect to the binding between level of access for a user entity 102 and the presented identity information. The level of assurance is a required level of trust (i.e., threshold) to allow access to a service or a transaction to be approved. One type of LOA is dynamic LOA which is capable of increasing or decreasing within a session. The concept of Level of Assurance was described in U.S. Pat. No. 9,426,183, filed on Jul. 28, 2014; U.S. Pat. No. 10,325,259, filed on Mar. 18, 2015; U.S. Pat. No. 10,387,980, filed on Jun. 6, 2016; and U.S. Pat. No. 10,824,702, filed on Jul. 24, 2020; each of these patents are assigned to Applicant and each of these patents is hereby incorporated in their entirety by reference.

Level of Assurance Provider (LOA Provider): may be a mobile device (e.g., user entity device 104) or stationary device (e.g., client device 106) associated with the user entity 102 and registered with risk engine 110 (e.g., a separate LOA Server or located on a relying party 109 server) and configured to confirm (or decline) a transaction authorizing access to elevated relying party services (e.g., multi-factor authentication). Alternatively, the LOA Provider may be a user entity 102 (e.g., human) who provides the biometric information or decision to approve or decline through the user entity device 104 (or client device 106) via collection of methods and credentials.

Location Based Services (LBS): triangulated user entity 102 location information shared with the identification proofing system and method 100 which is derived from user entity devices 104, client devices 106, physical access control systems, and/or RFID signals derived from badging systems.

Machine learning: an application of artificial intelligence (AI) that provides computer systems the ability to automatically learn and improve from data and experience without being explicitly programmed. System and method 100 uses statistical learning and optimization methods that let the computer(s) disclosed in FIGS. 2A-6 to analyze datasets and identify patterns. The machine learning techniques used herein leverage data mining to identify historic trends to inform future models. The unsupervised machine learning process used herein includes at least three components. First, a decision process wherein a recipe of calculations or other steps that takes in data (e.g, bio-behavioral data of user entity 102) and returns an estimate at the kind of pattern in the data the system and method 100 is looking to find. Second, an error function which is a method of measuring how good the estimate was by comparing it to known examples. Third, an optimization method wherein the system and method 100 looks at the miss and then updates how the decision process comes to the final decision so that the next time the miss will not be as great.

Modules: may constitute either software modules (e.g., code embodied on a machine-readable medium or in a transmission signal) or hardware-implemented modules (which may be referred to as "hardware modules"). Certain embodiments are described herein as including logic or a number of components, modules, or mechanisms. A "hardware module" as used herein is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

Network (112): means any combination of electronic networks, including without limitation the Internet, a local area network (LAN), a wide area network, a wireless network and a cellular network (e.g., 4G, 5G). Network 112 may be a secure network using encrypted communications. The network 112 may use network security protocols such as Secure File Transfer Protocol (SFTP), Secure Hypertext Transfer Protocol (HTTPS) or Secure Socket Layer (SSL) Protocol.

Network Security Policy (or Policy): rules for computer network access which determines how policies are enforced and lays out some of the basic architecture of the security/network security environment of identification proofing system and method 100.

Out of Band Notification: one form of two-factor or multi-factor authentication that requires a secondary sets of verification method through a separate communication channel(s) along with an identification and password.

Policy Orchestration: managing and synchronizing pre-determined security policies among a relying party 109, risk engine 110, smart data hub 108, user entity device 104 and client device 106.

Processes (or Methods): some portions of this specification are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

"Processor-implemented Module": a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

Real Time: the time associated with authorization periods described herein which range depending on the type of transaction, need and urgency for authorization. The authorization time periods may vary from under 10 seconds to 24 hours or more. Real time authorization as used herein prevents fraud at its inception versus mitigating it in a post event notification. Real time may also refer to the time for the transaction to complete.

Refresh: periodically, an LOA Server will perform a "refresh" to update at least some of the plurality of verified attributes and the verified credentials based on predetermined policies and on demand from a relying party 109 server (RP Server). For example, refresh can be a time based or policy or rule based reconnection of a LOA Provider (e.g., user entity device 104) to the LOA Server (e.g., risk engine 110) to say that a remote secure password is renewed or changes.

Relying Party 109: is the entity concerned about authentication and authorization of associated user entities 102 such as an employee or customer. The relying party 109 could be a bank, hospital, a company or the government. The relying party 109 may be in multiple sectors requiring multiple interactions among its employees (i.e., user entities 102) such as financial institutions, healthcare, airport operators, Transportation Safety Administration (TSA), hotel operators, retailers, education institutions, government agencies and associated social services, social networks, and websites. A relying party 109 will typically use a server(s) (i.e., the Relying Party Server(s)) as a manifestation of its intentions. "Relying Party" and "Relying Party Server(s)" shall be used interchangeably herein.

Relying Party (RP) Services: may typically be any web or on-premises service requiring approval for access with dynamic different levels of assurance within. Relying Party Services can be any transaction including authorized login such as Web or on-premise log-in; Virtual Private Network (VPN) log-in; transaction monitoring; financial transaction for online or a point of sale (such as the dollar amount, type of transaction including check versus wire versus cashier check); a workflow for approving, viewing or modifying data on a server; access to confidential versus restricted data; and physical access control to a building or secure space. Relying Party Services can be an application (i.e., Relying Party (RP) Services Application) and/or application programming interface (API) residing on a user entity device 104 and/or client device 106; be part of an RP Server 109; and/or be located at a separate server. In addition, an RP Service may be an application executing on a user entity device 104 and/or client device 106 and connected to the RP Server(s) and/or located at a separate server, wherein the RP Server(s) and/or separate server provides the data and executables for providing the service through the application.

Risk Engine 110 (also known as an LOA server) (e.g., Acceptto eGuardian® server): a server that provides a continuous identity verifier services. The risk engine 110 may be a Machine2Machine (M2M) server. The risk engine 110 may be part of the same server as a relying party server 109 or located in a separate server at the same or a remote location. The risk engine 110 interacts with a smart data hub 108 as described herein.

Risk Score (or trust score or confidence score) 114: a score set by the smart data hub 108 and/or risk engine 110 to determine whether a user entity 102 is authenticate. A risk score shall be determined by combining user entity 102 data, user entity device 104 data, client device 106 data, egocentric data and allocentric data as well as other types of information discussed above. All of this information and various user entity 102 proximity vectors, behavioral patterns, and biometric data (e.g., fingerprint, face identification) from the user entity device 104, client device 106, risk engine 108 and smart data hub 110 are combined and converted to a risk score 114.

Security Assertion Markup Language 2.0 (SAML 2.0): an extensive markup language (XML)-based framework for authentication and authorization between user entity devices 104 and/or client devices 106.

Security Information and Event Management (SIEM): aggregate security information management and security event management functions into one system to collect relevant data from multiple sources, identify deviations from the defined norms and provide an early warning or even take appropriate action as needed to inform enterprise information security and information technology (IT) experts of a possible threat during an event or post an event.

Server: means a server computer or group of computers that acts to provide a service for a certain function or access to a network 112 resource. A server may be a physical server, a hosted server in a virtual environment, or software code running on a platform.

Service (or application): an online server (or set of servers) and can refer to a web site and/or web application.

Significant Events: a defined normal (or abnormal) event of interest defined by a policy engine 110a of a risk engine 110 or through the artificial intelligence/machine learning (AI/ML) cognitive engine 330 that can trigger a condition of interest. The condition of interest may demand a change in the level of assurance (i.e., dynamic LOA) required in real-time during an active session to initiate a need for response to authenticate, authorize, audit or even deny service where appropriate.

Smart data hub: the smart data hub 108 enforces behavioral verification which allows a digital behavioral modeling of user entities 102, their proximity and location, their risk in the context of contact with other user entities 102, the risk and class of actors and user entities 102 based on their proximity, path to classification, anomaly detection and commonality analysis. The user entity 102 modeling is transmitted to the smart data hub 108 from user entity device(s) 104 and client device(s) 106. In some embodiments, smart data hub 108 and the risk engine 110 are one and in other embodiments they are separate.

Software: is a set of instructions and its associated documentations that tells a computer what to do or how to perform a task. Software includes all different software programs on a computer, such as the operating system and applications. A software application could be written in substantially any suitable programming language. The programming language chosen should be compatible with the computer by which the software application is to be executed and, in particular, with the operating system of that computer. Examples of suitable programming languages include without limitation Object Pascal, C, C++, CGI, Java and Java Scripts. Further, the functions of some embodiments, when described as a series of steps for a method, could be implemented as a series of software instructions for being operated by a processor(s), such that the embodiments could be implemented as software, hardware, or a combination thereof.

Spatiotemporal Velocity: user entity 102 transaction, access and login inference based on time and location and scoring based on proximity, distance of travel and time feasibility.

Threat Actor (or Bad Actor): a human or machine attempting to gain unauthorized access to a network 112, a user entity device 104, a client device 106 and/or relying party 109 services.

Token: an electronic software access and identity verification device used in lieu of or with an authentication password.

Trusted Device: a known user entity device 104 or client device 106 (or their browsers 105 and 107) over which an organization has some control and can assume some level of basic security. Typically, the user entity device 104 and client device 106 feature a software agent that directs traffic to the corporate network 112 so basic security checks such as a passcode and up-to-date operating system (OS) can be done. Once these checks are completed, a trusted device (104, 106) will usually receive unrestricted network access so the user entity 102 can retrieve all the information they need to work remotely.

User Entity 102: may be a person of interest or a person in proximity to the person of interest, entity, machine entity, user entity agent, client, client agent, subscriber, requesting agent and requesting party and may be human or machine.

User Entity Device 104: may be any device associated with a user entity 102.

FIG. 1 shows a view of the identification (ID) proofing and risk engine integration system and method 100. The system and method 100 is a risk analyzer which uses an identity proofing framework as the guardrail for resolution, validation and verification of user entity 102 identity to ascertain that the user entity 102 is who they claim they might be. The system and method 100 solves the need to provide identification and authorization for a transaction or service. Three steps of allowing access or registration include resolution, validation and verification. Resolution is capturing information. During the resolution steps, the user entity 102 provides proof it is the correct user entity 102 (e.g., email address). Knowledge of the user entity device 104 will be captured and go towards identification proofing (e.g., fingerprinting). Validation is proving the user entity 102 is who he says he is. The user entity 102 may provide identification scanning such as a selfie picture, drivers license, national identification card, or passport. During validation, the system and method 100 will go to a risk engine 110 and smart data hub 108 for a risk analysis. If it is a new access attempt (e.g., registration), risk engine will go to other data sources (e.g., third party data sources such as credit agencies) to verify claim identity. After validation, there follows verification which is obtaining contact information of the user entity 102 and closing the loop by notifying the owner user entity 102 that their identity might be at risk. FIG. 1 shows a workflow which includes capturing data from the user entity device's 104 hardware and associating it with a user entity 102. This workflow will be discussed in detail below.

The system and method 100 collects user entity 102 biometric and behavior based information for providing and restricting access to a service (e.g., for transaction purposes), secure website or computer network and its assets to a valid user entity 102. In FIG. 1, the system and method 100 identifies user device 104, user device applications 104*a*, user device browser(s) 105, client device 106, client device applications 106*a*, client device browser(s) 107, and user entity 102 behavior unique attributes. Risk engine (e.g., Acceptto eGuardian® risk engine) 110 and smart data hub 108 store and later match to infer change upon subsequent transactions and measuring transaction risk (i.e., risk score 114) through a search and match against classified set of static and dynamic attributes. The system and method 100 will track user behavior based on user entity 102 habits, transactions (e.g., cyber transactions) and device (104, 106) access. The user device 104 accompanies the user entity 102 in their daily activities. The identification proofing system and method 100 will further determine a risk score (or confidence score) 114 associated with each transaction executed on devices 104 and 106. User habits and fingerprinting are captured with the ability to detect abnormalities through AI/ML devised processes in smart data hub 108 using user entity device 104 and/or client device 106. The movement and actions of user entity 102 may be tracked throughout their activities for a predetermined time period (e.g., days, weeks, or months). Behavioral information may further include data related to the user entity 102 based on sensor information, such as, but not limited to WiFi and associate public internet protocols (IP), Bluetooth®, and/or motion sensors (e.g., accelerometers, gyroscopes, magnetometers) in user device 104. In addition, physiological patterns associated with a user entity 102 such as walking gait, location, network, time of day, velocity, and device type which all may be included as part of the behavioral profile for a behavior based identity for a user entity 102. The higher level behavior inferences such as location that the user entity 102 slept in, time duration that the user entity 102 slept for, the location user entity 102 slept at, running/exercise schedule, locations the user entity 102 visited prior to reaching work (e.g. user car, coffee shop, gym, etc.), web surfing patterns on the user device 104, travel time to or from known trusted location (e.g., secure facility), and proximity verification on a trusted location may all be used for training and inference and used in the risk analysis in risk engine 110 and smart data hub 108.

The user entity device 104 and/or client device 106 may be registered to (and binded to) a particular user entity 102. The user entity device 104 may be any communication device (including wireless devices) that can receive and transmit messages. User entity device 104 may be in the form of a mobile device which also may have applications 104*a* and a user entity device browser 105 (e.g., smart phone such as an Apple® iPhone®)). The user entity device 104 may also be a smart device such as a watch, ring or fitness device. Alternatively, the user entity device 104 may incorporate or function on multiple electronic devices or may be any of a variety of electronic devices that a user entity 102 happens to be using at the time. The user entity device 104, client device 106 or a module that is embedded within the user entity device 104 or client device 106 may have a user identity proofing component such an embedded biometric service, feature or capability. These identity proofing components may include voice, face, fingerprint, walking gait, and other unique identifiable biometrics that may be decentralized using various sensory solutions that can uniquely identify the user entity 102 and their associated login or transaction. An application (104*a*, 106*a*) on the user entity device 104 or client device 106 collects this information and provides to risk engine 108. The application (104*a*, 106*a*) may also be a mobile device manager (MDM) installed to ensure certain policies associated with the use of the user entity device 104. By connecting the user entity 102, user entity device 104, user entity device browser 105, client device 106, client device browser 107 and/or smart data hub 108 habits to the contextual data used in the threat actor analysis it is possible to model user entity 102 normal behavior and detect abnormalities. In certain instances, the user entity device 104 may be a mobile device that is either issued or trusted by the relying party 109 to gather user entity 102 behavior information.

Client device 106 may be in the form of a desktop personal computer having a client device browser 107 and discrete or integrated client device applications 106*a* for connectivity, communication, data exchange and other services. The client device 106 may be another device upon which the user entity 102 is operating and may be capable of performing client device applications 106*a*. The client device 106 may be any suitable electronic, computational, and/or communication device for conducting transactions, such as a cloud device (e.g., iCloud), desktop computer, cash register, kiosk, order terminal, electronic lock, automobile lock, payment processing and point of sale device.

The risk engine 110 may be used to identify and monitor user entity 102, user entity device 104, user entity device browser 105, client device 106, and client device browser 107 behavior unique attributes including location, proximity, and risk associated with exposure. User entity device 104 and client device 106 may collectively gather data based on the user entity 102 behavior and create or augment a behavior based identity for the user entity 102. As discussed, the collection or gathering of data may be performed using a secure operator application (104a, 106a) installed on the user entity device 104 and/or client device 106.

The risk engine 110 may, in various examples, be Machine to Machine Digital Key Authentication (M2M-DKA) servers and may utilize a secure communication protocol over network 112. The risk engine 110 of identification proofing system and method 100 generally, may provide an integrated per user entity 102 contextual pattern detection such as location, proximity to other user entities for a network 112, client device 106, and/or a relying party 109 enabling transparency and detection of movements of the user entity 102.

A user entity 102 can use either user entity device 104 or client device 106 separately or at the same time. Both user entity device 104 and client device 106 are coupled to risk engine 110 and smart data hub 108 through network 112. The user entity 102 behavior patterns (e.g., habits) with user entity device 104 and client device 106 and applications and services embedded or added and attributes of the user entity device 104 and client device 106 can all be monitored by the risk engine 110 and smart data hub 108. Recording these attributes creates a "normal" threshold to be used in determining the threat associated with allowing the user entity 102 access. In addition, these attributes may be used in constructing risk score 114. The user entity device 104 and/or client device 106 collectively gather data based on user entity 102 behavior such as flow of use of applications, micro services within the applications (104a, 106a), data usage, and in general the egocentric versus allocentric behavior of the user entity 102. The risk engine 110 creates or augments a behavioral based identity for the user entity 102 by graphing the patterns of the user entity 102 of interest, user entity device 104, client device 106, and pattern of applications (104a, 106a) and data used by the user entity 102. By graphing predictable events, the risk engine 110 and smart data hub 108 can determined which events are predictable and which are not. The collection or gathering of user entity 102 behavior data may be performed using the secure operator applications 104a, 106a installed on the user entity device 104 and/or client device 106. Components of the identification proofing system and method 100 of the present embodiments include: i) user entity device 104 data; ii) behavior inference using both user entity device 104, user entity device browser 105, client device 106 and client device browser 107; and iii) portal device and browser finger printing combined which enables an assembly of data about the user entity 102 and its user entity device(s) 104 and client device(s) 106. The data is captured for real-time and post analytics in the smart data hub 108 and risk engine 110 and hence unleashes the power of bio-behavioral monitoring.

The network 112 may include or be accessed by WiFi, Bluetooth, radio-frequency identification (RFID), near field communications (NFC), fourth generation long term evolution (4G-LTE) cellular, and/or fifth generation (5G) cellular and similar communication technologies. The network 112 may be accessed through a secure website.

Figure 2A:
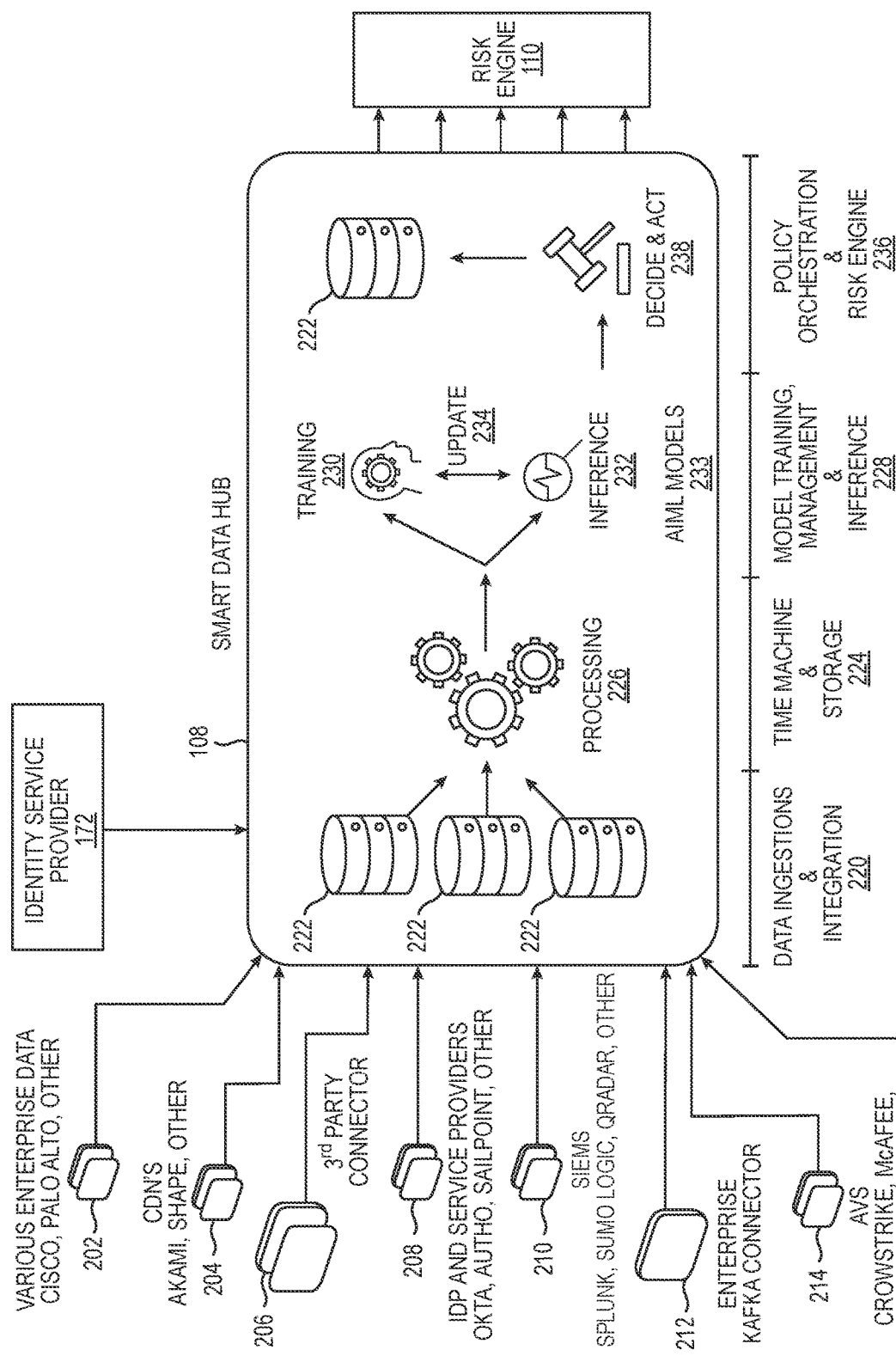
FIGS. 2A-2B illustrate a smart data hub 108 to be used in the identification proofing system and method 100.
Figure 2B:
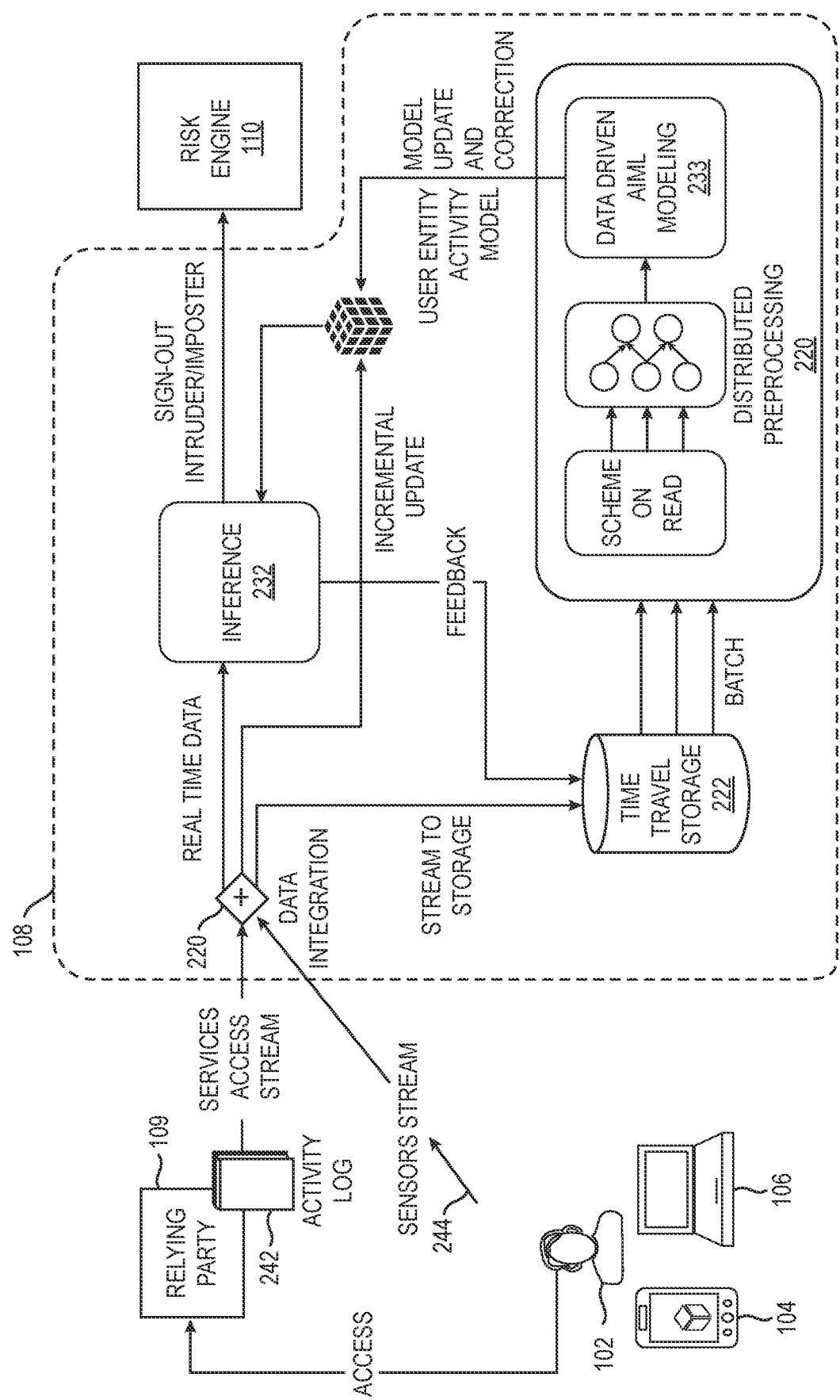

FIGS. 2A and 2B show the details of operation of the smart data hub 108. Risk engine 110 works with smart data hub 108. Smart data hub 108 uses stream processing rather than batch processing. Batch processing is the scheduled transmission of a limited set of records. When the number of records in a batch is infinite, then the batch data is dubbed a data stream. Thus, a data batch is a special case of data stream, where the number of records is finite, while data stream is an infinite set of records received from one or more sources, such as sensors or web server access logs. In data stream processing, the data keeps coming from the sources over time. To process a data stream, there is defined a window of time (or other types of windows) on the stream, which leads to buffering a small batch of data for every window of time passes. Then, the batch processes are run on the generated batches sequentially until the end of the stream. Batch and stream are two faces for the same currency with performance and accuracy differences. In stream processing, the data is processed as it becomes available; therefore, the stream processing response to the data changes is faster than the batch processing. With stream processing, it is not required that the data to be stored in a batch of 24 hours in order to do traditional batch processing. Stream windows can overlap and have complex forms that are hard to orchestrate and schedule in traditional batch processing systems.

The smart data hub 108 keeps web server access log files and other logs for an extended predetermined time period before deleting them to allow for continuous behavioral verification and monitoring of user entities 102. The input for the behavioral verification is the access logs and other logs in the smart data hub 108. The behavioral verification does not only authenticate the user entity 102 on the location, position and login to devices 104 and 106, but continues to verify the user entity 102 over time while the user entity 102 performs his or her activities.

FIG. 2A shows the details of smart data hub 108 which comprises four main components running on the data streams: i) data ingestion and integration components 220; ii) data management (e.g., time machine) and storage components 224; iii) model training, management and inference components 228; and iv) policy orchestration and risk engine components 236. The smart data hub 108 receives inputs from a plurality of external systems including various enterprise data (e.g., Cisco, Palo Alto Networks) 202, Content Delivery Networks (CDN's) (e.g., Akamai, Shape) 204, third party connector 206, identity providers (IDP) and service providers (e.g., Okta, Autho, Sailpoint) 208, secure information and event management (SIEMs) (e.g., Splunk, Sumo Logic, Qradar) 210, Enterprise (e.g., Kafka Connector) 212, anti-virus services (AVS) (e.g., CrowdStrike, McAfee) 214 and Location Based Services (derived from user entity devices 104, client devices 106 and other sources) 216. The data feed from the external systems 202-216 (e.g., SIEM logs, application programming interfaces (APIs), domain name system (DNS) Security logs, and CDN logs) flow into the data ingestion and integration component 220 of the smart data hub 108. The data is ingested into large storage systems 222 in which the data stream is cleaned and integrated with other data streams. The data integration component cleans and integrates data streams from sources 202-216 and unifies the data with an internal data format. The data is processed 226 in step 224 to create a time machine that stores the locations and behaviors of the user entities 102. The time machine allows the relying party 109 to examine back in time the movements of a person of interest. In step 228, the internal data stream flows into the model training 230 and inference components 232 of AI/ML models 233. The model training 230 and inference components 232 share updates 234. The artificial intelligence (AI) model management includes an online (incremental) training of some AI/ML models and batch training. The location based services (derived from devices 104 and 106 and other sources) 216 and derived location from other 202-214 systems validate the user entity 102 location and proximity at any given time and contact with other user entities 102. Though the incremental training allows the latest data to contribute to the inference decision, it decreases model accuracy over time; thus, there is an advantage to readjusting the accuracy with a batch training every twenty four hours. In step 236, the smart data hub 108 will decide and act 238 on which data to send back to the storage systems 222 along with the label acquired from inference for later training and correction of the AI/ML models 233. Data is passed to the decision-making risk engine 110 to rate behavior to create a risk score 114. The risk engine 110 aggregates the risk from various risk analyzers including those from the smart data hub 108, third party risk scores or its own risk analyzers to set a risk score 114. Alternatively, the risk engine 110 could just use the risk score 114 determined by the smart data hub 108.

The smart data hub 108 enforces behavioral verification which allows a digital behavioral modeling of user entities 102, their proximity and location, the risk and class of actors and user entities 102 based on their proximity, path to classification, anomaly detection and commonality analysis. Combined with data streaming this makes the bio-behavior system 100 evergreen. AI/ML models 233 perform predictions on the data streams which makes detection of imposters and tracking of persons of interest possible at a low latency. Updating AI models in traditional systems happens optimistically every 24 hours. The smart data hub 108 is configured to perform an incremental update to of the AI/ML models 233 over a predetermined stream window.

The smart data hub 108 has multiple benefits. Besides the high security and the performance, the smart data hub 108 contributes to relying parties 109 with the following advantages: continuously tracking and tracing the behavior and location of user entities 102, behavioral authentication, providing the infrastructure for highly secured physical locations, passwordless systems, transparency of the user entity 102 activities in the system or location, and direct monitoring of the user entity 102 activity by the smart data hub 108 system. Further, the smart data hub 108 allows the mass ingestion of very large amounts of data from a plurality of varying sources including any log or data sources. In addition, the smart data hub 108 applies the AI/ML models 233 to understand the large amounts of data, detect anomalies, and provide risk score 114 from these models to the risk engine 110.

The smart data hub 108 measures context and behavior which is derived from context such as a user entity 102 location and proximity to other user entities 102 or locations but has an element of frequency and time order in the time machine 224. By constantly observing and analyzing user entity 102 routines, the process of biobehavioral modelling creates discrete models 233 that allow the smart data hub 108 to continuously track a plurality of user entities 102 as well as predict the next actions of the user entities 102. This modeling process applies technologies from AI/ML and affects many levels of the user entity's 102 daily activities and life. From commute and exercise activity to browser behavior and particular computing devices to more subtle patterns like the unique characteristics of a user entity 102 walking gait and other biometrics. This unique combination of factors unambiguously characterizes the user entities 102 and allows the decision-making risk engine 110 to rate behavior. Consequently, the risk engine 110 computes a dynamic level of assurance that takes the maximum of contextual information into account. Similar to the dynamic nature of human lives, the biobehavioral analysis continually observes and adapts to changes and "grows" together with its user entities 102 and allows for cognitive continuous authentication.

Analyzing daily behavior of a user entity 102 may be achieved via a mobile device 104, client device 106 and ambient data surrounding these devices. Bio-behavior involves a user entity that tries to access a physical location, come into near contact with another user entity 102, or a remote or local resource that requires some sort of confirmation of event and authentication. While location or device fingerprinting for physical presence or remote access and biometrics for local access can all be used for verification and authentication of presence both are vulnerable to error or replay attacks a combination of both passive and active. The bio-behavior approach may also rely on an out-of-band device such as a mobile phone or wearable devices to verify the event of interest inclusive presence and proximity to a location if interest or other user entities 102. Multifactor authentication (MFA) requires an additional confirmation of intent by user entity 102 via some sort of out-of-band device (e.g., a confirmation on a user entity device 104 such as a mobile phone confirming that user is here) significantly increases accuracy, safety and security.

The identification proofing system and method 100 benefits from the rich sensors in modern mobile user entity devices 104. Based on that, the employed artificial intelligence uses machine learning to create AI/ML models 233 that can recognize regular and abnormal, presence, proximity, behavior, and detect anomalies in the ambient sensor data (e.g., proximity to other user entity devices 104, background noise (or lack of background noise) when in a public space, an unusual user entity 102 walking gait, or no movement). In general, identification proofing system and method 100 can verify whether a user entity device 104 or client device 106 is still in the possession of its owner user entity 102. Part of the location and proximity verification or digital authentication process that results is a derived location confirmation. Identification proofing system and method 100 is capable of providing additional, reliable information such as the owner user entity 102 verified location and current activity. For instance, a proximity to more than a predetermined N number of people may be unlikely if the user entity 102 is currently indoor exercising and even more so if the location verification transaction is requested from a user entity device 104 or client device 106 reflects high risk. On the other hand, the system and method 100 is adaptive and behavior considered unusual by a majority can be perfectly normal for an individual's unique bio-behavior model. Eventually, the AI/ML models 233 contribute to the overall level of assurance in determining the presence and proximity to a location that grants a risk score 114 of the proximity of a user entity 102 to other user entities 102 derived from physical and digital signatures of user entities 102.

FIG. 2B illustrates user entity 102 or client device 106 gaining access to a relying party 109 system. Their activity is tracked by an activity log 242. Services access 243 from the relying party 109 and sensors stream 244 are streamed to the smart data hub 108. Data integration 220 takes the sensor data from user entity 102 and its devices 104 and 106 to determine the user entity 102 location, user entity device 104 and application 104a access data, client device 106 and application 106a access data and various other contextual and behavioral data is streamed into the data integration module 220. The data is then fed into the inference engine 232 where user activity models 233 using applied AI/ML processes detect anomalies and threats to a relying party 109. This information is fed to risk engine 110 which calculates the risk score 114. Risk engine 110 also provides a notification system, early warning, authorization step-up, and user entity 102 sign-out or isolation when required. User entity 102 location and activities are stored in time travel storage 222 and used for continuous analysis that gets batched into the AI/ML model 233 processing engine.

The system and method 100 of FIGS. 2A-2B provide a identification proofing system and method 100 for monitoring a secure network. A first plurality of processors (which will be discussed in connection with FIG. 6) having artificial intelligence and machine learning (AI/ML) capabilities form a smart data hub 108 and a second plurality of processors form a risk engine 110. Both the smart data hub 108 and risk engine 110 are coupled to a network interface (reference 116 in FIG. 6). The first and second plurality of processors are configured to continuously capture contextual and behavioral factors of one user entity 102 at the smart data hub 108 to develop a bio-behavioral model of the user entity 102 through machine learning. The risk engine 110 receives an access request, log in request and/or transaction request from a relying party server 109 at the risk engine 110. Next, the risk engine 110 contacts a user entity device 104 to collect recent contextual and behavioral data of the user entity 102 from the user entity device 104. Next, the system and method 100 receive the recent contextual and behavioral data of the user entity 102 at the risk engine 110. The risk engine 110 sends the recent contextual and behavioral data of the user entity 102 to the smart data hub 108. The smart data hub 108 retrieves the bio-behavioral model of the user entity 102 and updates with the recent contextual and behavioral data of the user entity 102 to form an updated bio-behavioral model of the user entity 102. The smart data hub 108 compares allocentric and egocentric factors of the log in attempt and/or transaction request with the updated bio-behavioral model of the user entity 102 to determine the level of abnormalities associated with the access or transaction request and determine a risk score 114. The smart data hub 108 sends the risk score 114 back to the risk engine 110. At the risk engine 110, the risk score 114 is combined with a plurality of risk analyzers to determine whether an approval of the access attempt and/or transaction request should be sent to the relying party 109 or request of an out of band authorization should be made from the user entity device 104. If the out of band authorization is successful, the risk score 114 is reset and the approval of the access attempt and/or transaction request is sent to the relying party 109 and if the out of band authorization is unsuccessful, a disapproval of the access attempt and/or transaction request is sent to the relying party 109. In an alternative embodiment, the system and method 100 continuously capture contextual and behavioral factors of a plurality of user entities 102 and client devices 106 at the smart data hub 108 to develop a bio-behavioral model of the plurality of user entities 102 through machine learning and separate the contextual and behavioral factors of the plurality of user entities 102 into categories. Next, the system and method 100 receives a transaction request from a relying party server 108 at the risk engine 110 and retrieves the bio-behavioral model of at least one of the categories. The system and method 100 compares allocentric and egocentric factors of the transaction request with the at least one of the categories to determine the level of abnormalities associated with the transaction request and determine a risk score 114 and send the risk score 114 back to the risk engine 110. The risk engine 114 then sends a level of risk classification 113 (e.g., weak, unacceptable, weak, fair, strong or superior) and/or risk score 109 back to the relying party 109.

Figure 3:
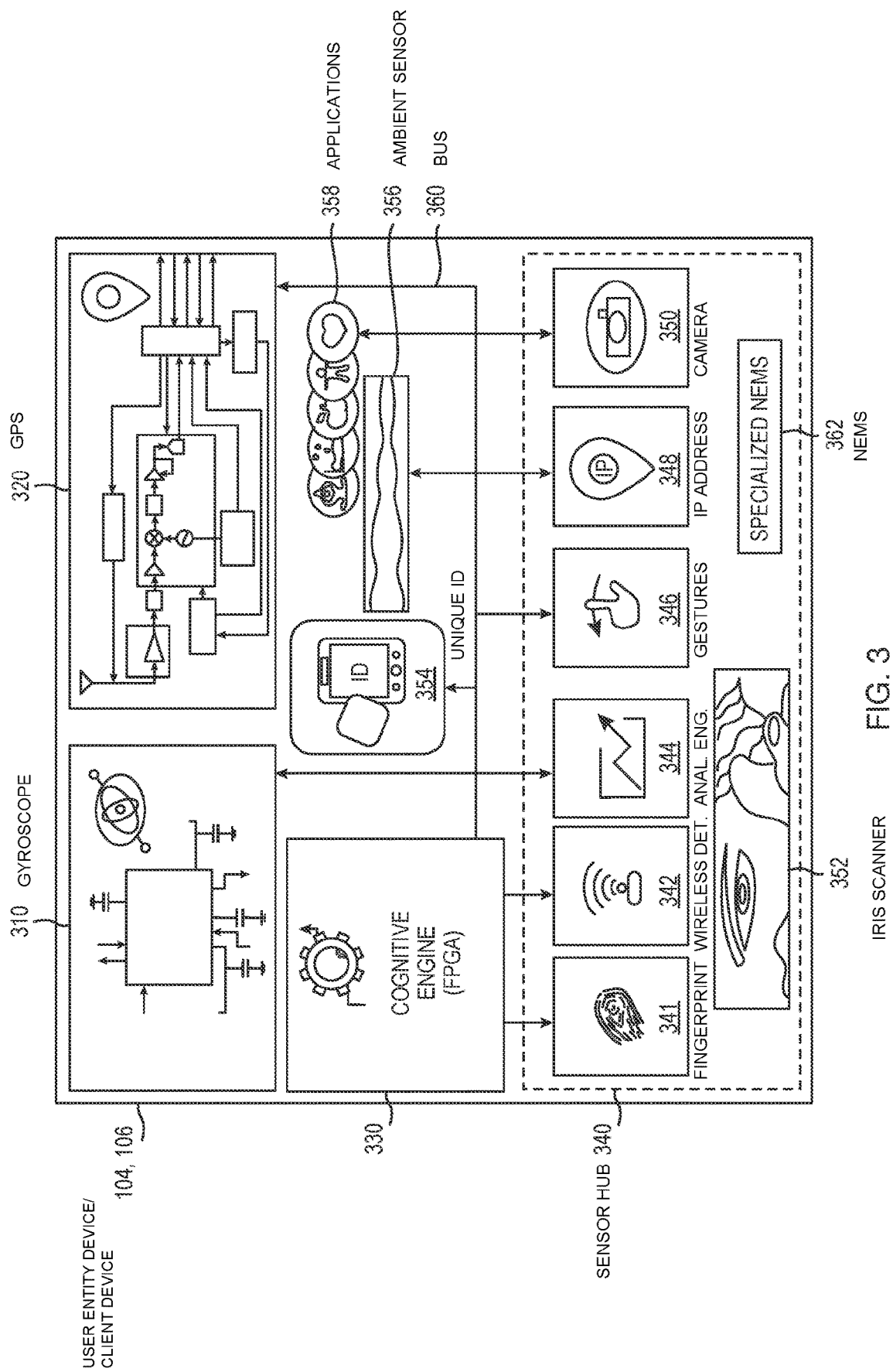
FIG. 3 shows that a user entity device 104 and client device 106 may include transceiver equipment of a modern smartphone such as a gyroscope 310 and a global positioning satellite (GPS) 320 and can track the behavior and habits of a user entity 102.
Figure 4:
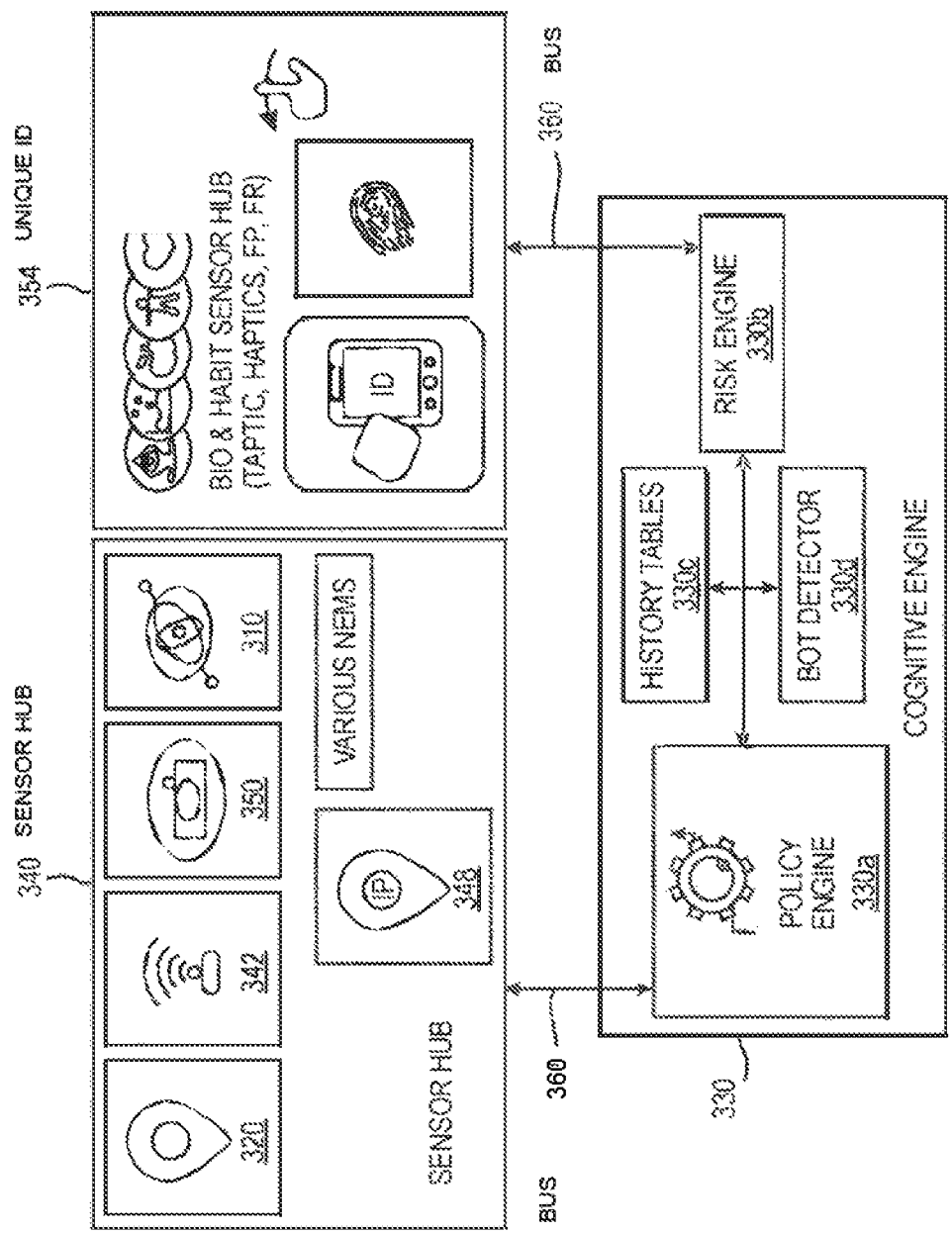
FIG. 4 illustrates more details of a cognitive engine 330 and sensor hub 340 that are part of the user entity device 104 and client device 106.

FIGS. 3 and 4 illustrate an example of a user entity device 102 and/or client device 106 that may be used with the identification proofing system and method 100. The user entity device 104 and client device 106 can each separately have all or some predetermined subset of components and functionalities as described below. User entity device 104 may be a wireless device with integrated compute capabilities, sensors and at least one field programmable gate array (FPGA) that is programmed with customized biobehavioral compute technology and customized nano-electromechanical systems (NEMS). The user entity device 104 may be a laptop computer, cellphone, smartphone (e.g., Apple® iPhone®), a wireless user entity digital assistant, wireless tablet (e.g., Apple® iPad®), wireless watch (e.g., smart watch and/or sports watch), wearable device (e.g., smart glasses), video game devices, wireless electronic patch, wireless device embedded under the skin, a wearable device mounted on a wristband, a wireless device on the user entity's clothing, and any other device capable of wireless communications with network 112. User entity device 104 could be a virtual digital tattoo with some radio frequency (RF) capability. The user entity device 104 also could be a virtual quick response (QR) code that is generated for user entity device 104 at the time of entry of facility and is associated with a moving user entity device 104 and is continually refreshed to allow for tracking the movement of the user entity device 104. The user entity device 104 may be tracked, detected and/or recognized using an ambient intelligence vision system.

As shown in FIG. 3, the user entity device 104 and/or client device 106 may include the transceiver equipment of a modern smartphone such as a gyroscope 310 and a global positioning satellite (GPS) 320. The user entity device 104 could also have a cognitive engine 330. Cognitive engine 330 may include a field programmable gate array (FPGA) connected to a biometric, habit sensor, application and sensor hub 340. The cognitive engine 330 may include a series of specialized nano-electromechanical systems (NEMS) 362. The FPGA of the cognitive engine 330 may be programmed with customized biobehavioral compute technology. In an alternative embodiment, instead of an FPGA the functions of the cognitive engine 330 may be implemented in other integrated hardware such as specialized application specific integrated circuits (ASICs). In an alternative embodiment, instead of an FPGA the functions of the cognitive engine 330 may be implemented in software. As shown in FIG. 3, sensor hub 340 is capable of receiving and analyzing inputs from a plurality of sensors and applications. The sensor hub 340 may include taptics, haptics, fingerprints, location coordinates and elevation, user entity 102 habits and facial, voice and ambient noise, magnetic signature, light, air distinct characteristics like humidity, carbon monoxide, and other recognition sensing capabilities. The sensors in the sensor hub 340 may also include customized NEMS 362. The sensors may be discrete or integrated into the sensor hub 340. The information from the hub 340 is collected and analyzed in cognitive engine 330 to provide a risk score 114 in evaluating the level of verification of the user entity device 104 and whether he or she (or machine entity) is the correct authorizing user entity 102. The sensor hub 340 may include a fingerprint input sensor 341 for a biometric input. The hub 340 may include a wireless detection sensor 342 that may be used to analyze a variety of wireless communication parameters such as a Service Set Identifier (SSID) and their associated attributes such signal strength and proximity to and use in local access networks (LANs) wireless LANs (WLANs), or WiFi access points.

Reference item 344 indicates an analytical engine which is configured to receive input from the other sensors in the sensor hub 340 to monitor the user entity 102 spatiotemporal and behavior patterns and habits to determine if the user entity 102 of the user entity device 104 is the correct entity. For example, habits might include environmental and/or behavioral patterns of the user entity 102 of the user entity device 104 such as the time the user entity 102 wakes up, arrives at the gym, arrives at a secure facility, and/or logs on to the network 112 and the like.

Sensor 346 is used to measure gestures regarding how the user entity 102 handles the user entity device 104 and/or client device 106. For example, these gestures might include how the user entity 102 swipes the screen of the user entity device 104 with their finger including pressure, direction, right handed vs. left handed, and the like. In addition, sensor 346 may measure the electromagnetic signature of the operating environment of the user entity device 104 to determine if it fits a profile for the user entity 102. For example, the subscriber identification module (SIM) card and mobile identification of the user entity device 104 combined with the background electromagnetic factors may all be used in a verification process that the user entity 102 of the user entity device 104 is the correct entity. Reference item 348 measures an internet protocol (IP) address being used by the user entity device 104 and may use a look up feature to verify the user entity device 104 is in a region typically occupied by the user entity 102. Camera 350 may be used for facial recognition of the user entity 102 and other biometric inputs such as a tattoo. In addition, the camera 350 may be used to capture a background of the user entity 102 of the user entity device 104 to determine if it is an environment in which the user entity 102 oftentimes is found (e.g., a picture hanging behind the user entity 102 of the user entity device 104 may conform to a user entity 102 profile). Iris scanner 352 may be used to confirm through an eye scan the identity of the user entity device 104 operator. Reference item 354 indicates the user entity device 104 "unique identification" which may be tied to a SIM card number and all associated unique signatures, an International Mobile Equipment Identification (IMEI) number or an Apple® identification, a telecommunications carrier (e.g., AT&T®, Verizon®), or battery serial number. Ambient noise sensor 356 measures the noise levels surrounding the user entity device 104 including noises from nature and manmade noises (including communication equipment produced radio frequency noise). Ambient sensor 356 may also be able to measure a speaking voice to create a voiceprint to be able to verify that the user entity 102 is authentic. Reference item 358 is an application that measures the "wellness" of the user entity 102 of the user entity device 104 including heart rate, sleep habits, exercise frequency, and the like to gather information on the user entity device 104 and the user entity's 102 lifestyle to contribute to verification decisions. Bus 360 couples the sensors and applications of the hub 340 to the cognitive engine 330.

FIG. 4 shows a more detailed view of the cognitive engine 330 and sensor hub 340. The cognitive engine 330 includes a policy engine 330a, a cognitive risk engine 330b, history tables 330c, and bot detector 330d. (The policy engine 330a corresponds to the user entity device policy engine 104c or the client device policy engine 106c). The policy engine 330a sets the factors in evaluating the risk when receiving input from the sensors and applications on the sensor hub 340. The cognitive risk engine 330b calculates the information received from the sensor hub 340 and makes a determination regarding a risk score 114 in regard to the current user entity 102 of the user entity device 104. The history tables 330c record the user entity's 102 habits of the user entity device 104. The bot detector 330d determines whether a computer program is attempting to trick the user entity device 104 into thinking it is a legitimate user entity 102 by simulating the device owner activities and is attempting to conduct a verification without the actual owner. In one implementation, the bot detector 330d monitors which applications 106a typically operate on the user entity device 104 and if it discovers a new application residing and running beyond the routine, it raises a risk level warning that something unusual is happening with the user entity device 104. Overall, the cognitive engine 330 assists in determination of the type of authentication required based on risk score.

Figure 5:
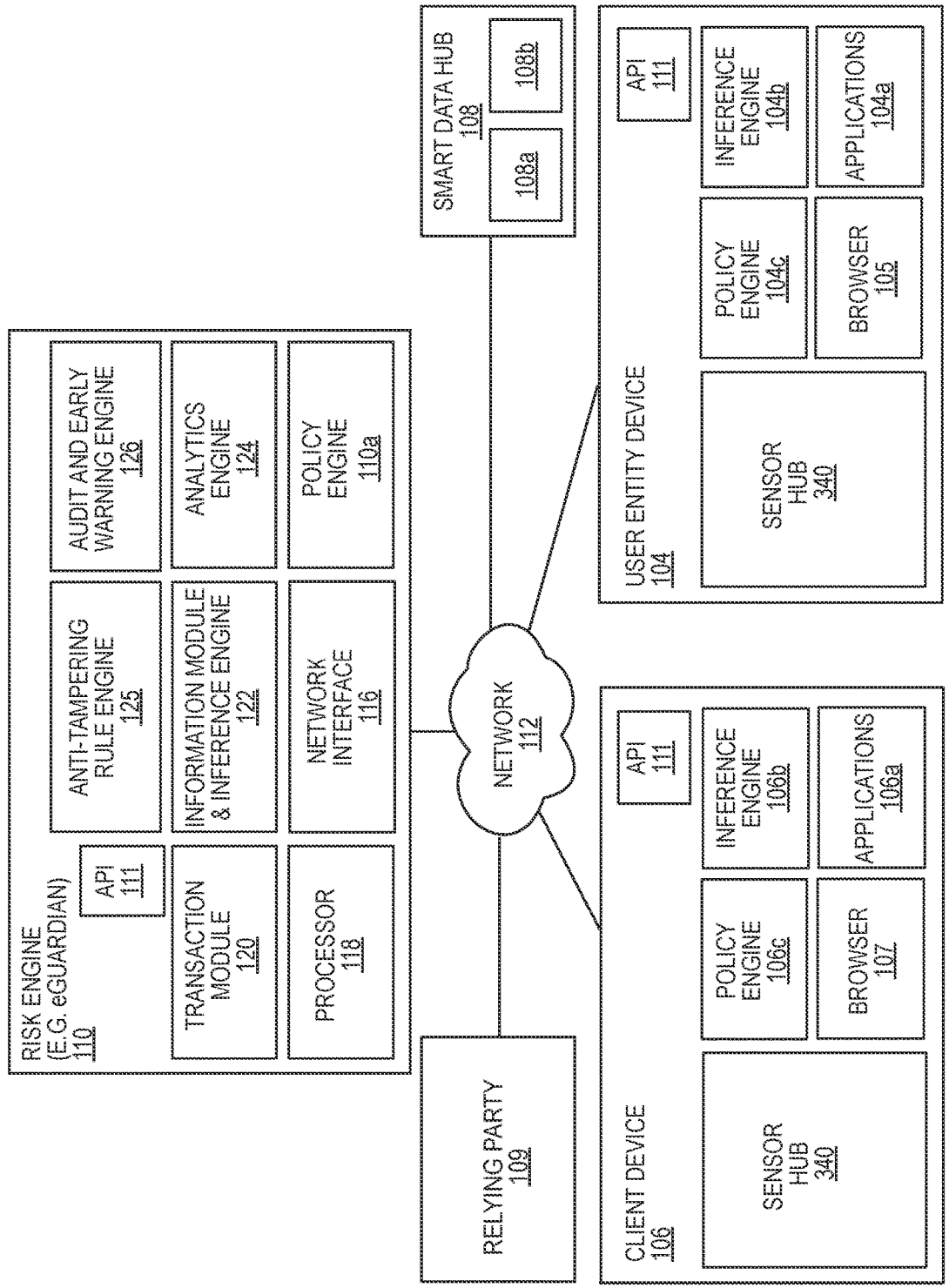
FIG. 5 illustrates a simplified view of identification proofing system and method 100 including a user entity device 104, client device 106, smart data hub 108, risk engine 110 and relying party 109.

FIG. 5 is a block diagram of identification proofing system and method 100 showing fewer elements than an overall system diagram shown in FIGS. 1 and 2A-2B. As discussed above, identification proofing system and method 100 includes a user entity device 104, a client device 106, a smart data hub 108 and a risk engine 110, in an exemplary embodiment. The user entity device 104, client 106, smart data hub 108 and risk engine 110 are communicatively couplable with respect to one another via a secure network 112 so that the risk engine 110 can monitor the user entity 102, user entity device 104, client device 106 and/or smart data hub 108 to gather behavioral and/or biometric data of a user entity 102 to determine whether they should be allowed access to the network 112. As discussed above, the network 112 may be the Internet or any other suitable public or private data network. The identification proofing system and method 100 may provide customer and transaction authentication based, at least in part, on biobehavioral verification, as disclosed above.

In the illustrated example shown in FIG. 5, the user entity device 104, client device 106, smart data hub 108 and risk engine 110 each incorporate a policy engine—user entity device policy engine 104c, client device policy engine 106c, smart data hub policy engine 108a and risk engine policy engine 110a. The policy engines 104c, 106c, 108a and 110a may establish a predetermined policy orchestration (i.e., coordination) for the identification proofing system and method 100 generally which may be established by a system manager. In various examples, the user entity device policy engine 104c, client policy engine 106c, 108a and the risk engine policy engine 110a may operate as a single policy engine for the identification proofing system and method 100 as a whole. Such a single policy engine may be provided by the risk engine 110 but may receive policy directions from the user entity device 104, client device 106 and/or smart data hub 108. In various examples, the user entity device policy engine 104c (and/or or risk engine policy engine 110a) may establish policy orchestration for policies and protocols concerning how and under what circumstances a user entity 102 may be validated, including circumstances in which a user entity 102 request for admittance to a client device 106, smart data hub 108, network 112 and/or a secure facility may be automatically approved or rejected. In various examples, the risk engine policy engine 110a may establish policy orchestration for policies concerning the circumstances in which an authorizing party (e.g., actual user entity 102) may be required to authorize a transaction of an entity asserting to be the user entity 102. Sensor hubs 340 located in each of the user entity device 104, client device 106 and/or smart data hub 108 allow a variety of environmental/contextual information to be monitored.

In the embodiment of FIG. 5, the risk engine 110 may be operated by or for the benefit of an enterprise which may be any party that may offer a service or control access to a user entity device 104, client device 106, network 112 or something for which attempts to engage by a user entity 102 may need to be authorized or authenticated by an authorizing party. The risk engine 110 includes a network interface 116 couplable to the network 112 and a processor (or processors) 118. The processor(s) 118 may be configured to implement policies provided by the system manager (or authorizing party) to a risk engine policy engine 110a as well as a transaction module 120 configured to complete a transaction (or validation) based on a request as received from the user entity 102. The transaction module 118 may further provide automatic authorizations or rejections based on authorization policies. The processor 118 may also be configured to implement an information module and inference engine 122 configured to transmit information to and receive information from the user entity device 104, such as authorization requests and response authorization approvals or rejections or tracking user location and proximity to other user entities 102. The processor(s) 118 may further be configured to operate an analytics engine 124 that calculates the risk score of each access to the network 112, client device 106 and transactions within post access and authorization to a system or location inclusive of proximity of user entities 102. The analytics engine 124 operates by analyzing and verifying user entity's 102 identity, inferring contextual data such as user entity device 104 and browser attributes, spatiotemporal velocity, and user entity 102 habits. The analytics engine 124 may be a Core AI/ML Analytics Engine platform core component. User entity 102 habits may be analyzed by using client device 106 and user entity device sensor hub 340. The analytics engine 124 may be a network allocentric or exocentric anomaly detection engine including data sources from the rest of platform stack such as Security Information Event Management (SIEM), Data Loss Prevention (DLP) or Privileged Access Management (PAM) tools to generate a biobehavioral derived score that is used to maintain the biobehavioral derived credential validity (if it is equal to and/or above the risk score 114). The biobehavioral derived credential validity may be needed to request for authorization in case of loss of confidence, demand for higher level of assurance, or to terminate access by resetting the derived key based on programmed policies of the policy engines 104c, 106c, and/or 110a. In FIG. 5, data from other sources such as internet of thing (IOT) devices that obtain additional ambient intelligence may be fused into the identification proofing system and method 100. These devices can be ambient third party data sources such as outside camera systems that see the user entity 102 as the user entity 102 travels around during a day in the city. The camera systems may recognize the user entity 102 car, phone or face which are all used to physically verify that the user entity 102 was really there in the location as opposed to user entity 102 digital persona and identifications (IDs) which can be injected into the system 100 electronically and make a synthetic signature of a user entity 102. User entity device 104, client device 106 and smart data hub 108 each have an inference engine 104b, 106b, 108b used in verifying the identity of the user entity 102.

FIG. 5 broadly illustrates how individual system 100 elements may be implemented in a relatively separated or relatively more integrated manner. The risk engine 110 includes is capable of monitoring user entity 102 device behavior, traffic, and fingerprint analytics. These elements of a risk engine 110 support a method to promote locations, machines, time and classifications of the type of transactions to trusted events based on contextual factors. Such contextual factors may include habits, location, devices, proximity, browsers and other factors that can uniquely identify the legitimate user entity 102 using behavioral modeling and context versus threat actors who cannot provide similar behavioral and contextual factors in spite of possession of other binary identity attributes and credentials. The risk engine 110 may establish the normality of events and distinguish significant events that can be classified (normal versus abnormal). A threat may be calculated for each access and/or transaction with the user entity device 104, client device 106, and/or network 112 and the transactions through the different stages and life cycle of access management including pre-authentication, at authentication and post authorization to deliver a cognitive continuous authentication identification proofing system and method 100. Further the risk engine 110 uses the information to calculate a risk score 114 to determine and classify the virus threat to the user entities 102.

The risk engine 110 as shown in FIGS. 1 and 5 has the following plurality of platform core capabilities. One, obfuscation to harden against commonality analysis and detection by fraudsters. Two, classification through common fields versus distinguishable fields. Three, at least one application programming interface (API) to send and receive encrypted data from third party providers. Four, significant analytics and inference capabilities to feed to the risk engine 110 (e.g., LOA engine) including determination of user 102 and associated location, proximity of user entities 102s' device 104s, user devices 106s' browser font, the device operating system (OS) version, central processing unit (CPU) model, canvas, native fingerprinting plugins, and proxy. The risk engine 110 further has communication and connectivity capabilities, service delivery and application programming interface (API) mechanisms to aggregate data from relying party applications. In addition, various third party databases, secure information and event management (SIEM) providers, User Behavior Analytics (UBA) tools, calculation of threat intelligence, bot detection and other cyber security tools used by enterprise can be integrated via a smart data hub and fed to the AI/ML powered risk engine 110. At the core of the risk engine 110 may be an artificial intelligence/machine learning analytics engine 124 that processes and analyzes the various data sources including data from a third party risk API, risk engine information module and inference engine 122 which is capable of detecting network 112 anomalies and user entity inference engine 104b (e.g., user entity biobehavioral engine). Analytics engine 124 is capable of measuring parameters that identify different classes of network attacks and anomalies at the time of any given set of transaction as both allocentric parameters of the traffic feeding into the inference engine 122 as well as user entity 102 behavior fingerprints. At the network level, this inference is achieved for attacks such as Transmission Control Protocol (TCP) synchronize (SYN), Internet Control Message Protocol (ICMP) and user entity 102 datagram protocol (UDP) flooding, and port scanning as examples of classes. These classes are measured by metering the number of flows with similar patterned payloads to the same destination socket, measuring total volume of flows in bytes and the average packets in flows and hence allowing to establish a distinct behavior by plotting a pattern of normal traffic. Other allocentric parameters of interest may include number of flows that have a similar volume, same source and destination address, but to various different ports. At the user entity 102 behavior level this inference establishes normality of a user entity 102 behavior such as their trusted location and user entity 102 spatiotemporal velocity. Also, in other examples, location and proximity inferences of user entity devices 104 is calculated versus their client device 106 and/or smart data hub 108 initiated transactions. This may be compared with the last event of interest including an authentication event or other significant events such as major Internet Protocol (IP) change, policy change, or ambient gross violation such as location-time violation that are provisioned by AI/ML configurable policy engine and fingerprinted by a user entity device 104 browser traffic device (UBTD) search & match engine.

Referring to FIG. 5, the trust level of the data collected by the risk engine 110 is a derived threat score (or confidence score) that depends on an anti-tampering rule engine 125 and the mobile application risk engine 110 which is all fed into the business application analytics engine 124. Analytics engine 124 calculates the risk versus friction and triggers an Audit & Early Warning Engine 126 to initiate an appropriate out of band transactions to inform a good user entity 102 of the intent via an Out Of Band (OOB) API. OOB API may use a mobile app, mobile device, and other methods of notification to receive a push notification or other methods of authentication such as OTP SMS/email/call or Timebased One Time Passwords (TOTP).

Data stored in a data base in the bio-behavior system 100 may contain personal identifier information (PII) and sensitive private information that needs anonymization. These are tokenized and hashed in transit and also at rest via an anonymization token engine that anonymizes the PIIs as a function of relying party privacy rules, guidelines and regional laws all via risk engine policy engine 110a (which may be an AI/ML configurable policy engine). Third party data about the user entity 102, user entity device 104, location and proximity, client device 106 and transactions are made available via third party data APIs 111 (shown in FIG. 5 in the user entity device 104, client device 106 and risk engine 110) enabling a cross company-industry data fusion which can provide black lists or white lists again via the risk engine policy engine 110a.

In FIG. 5, the user entity 102 behavior and journeys are tracked so that pre-authentication intelligence allows the risk engine 110 to predict and classify the user entity 102 and determined whether the user entity 102 is a high-risk infected or threat actor (e.g., a bot, suspect device, and/or suspect browser) or a good safe user entity 102. The data collection on user entity 102 behavior, user entity device 104, client device 106, smart data hub 108 and transaction risk is collected and results in a context aware risk based authentication which can balance risk versus friction for class of a good user entity 102 versus additional friction for threat actors including denial of service or a step up authentication for suspect, new, and/or high risk transactions. It is significant that post authorization in FIG. 5 the user entity 102 and their transactions may be continuously monitored and a dynamic level of assurance and even a denial of service is injected when the risk score 114 is calculated to be too high. An aggregate of the risk engine 110 and third party data provided by other analytics and risk engine platforms such as SIEM solutions as illustrated delivering the cognitive continuous authentication that may minimize risks even post authorization by detecting anomalies through the life cycle of a transaction and provide a novel technique to detect abnormal behavior and report to IT and user entity 102 of the services protected by risk engine 110.

Examples of data captured by the risk engine 110 such as behavior patterns and attributes of the user entity 102 may include the following. First, location, proximity and time of a plurality of other user entities 102. Second, user entity device 104, client device 106 and browser 105, 107 have fingerprints that uniquely identify a user entity device 104, client device 106, user entity browser 105, client device browser 107, a network 112, habits of user entity 102 on the user entity device 104 and/or client device 106 which are all used for accessing compute and data and services. User entity device 104 and client device 106 have footprints that may include browser attributes such as screen size, screen resolution, font, language, and browser version. Third, central processing unit (CPU) and operating system changes may not be acceptable but browser (105, 107) upgrade may be okay. Fourth, user entity 102 behavior and habits and inference of the user entity 102 normal behavior may be used to identify risks associated with access attempts and transactions. Fifth, trusted devices are devices 104, 106 that have been repeatedly authenticated over a period of time. The number of top trusted devices may be limited to a predetermined number (e.g., 5). Sixth, the system and method 100 may use a mobile device or other modalities of verification such as email, short message service (sms), voice, push, and voice call to promote locations, machines and time and type of transactions to trusted events/habits of user entity devices 104. The identification proofing system and method 100 allows for calculating individual transaction risk based on contextual factors such as user entity 102 behavior, user entity device 104, user entity device browser 105 and the network traffic and request for authentication by account owner when risk greater than allowed threshold. Seventh, a client device 106 (e.g., a PC desktop) that has not been used for a long period of time (e.g., days or weeks) will be dropped from a trusted device list. Eighth, location which may be found by Internet Protocol (IP) reverse lookup of Internet Service Provider (ISP). Ninth, user entity behavioral footprint on a desktop personal computer (e.g., client device 106) such as speed of user entity typing, number of hours and time intervals user entity is on this device (e.g., iMac® at home is usually used in evenings and weekends; use of touch screen feature). Tenth, user entity 102 behavior footprint might also include: time of use; location of use; hardware (including auxiliary devices such as type of keyboards, mouse, and user entity behavior on both); browser specific data such as browser updates and changes (i.e., heuristics), browser type, browser version, plug-in and applications; brand and type of CPU, operating system; browser user entity configuration such as fonts (e.g., expected fonts versus user entity configured fonts), language and the like; Canvas financial planning; type of display; screen resolution; and/or time zone, internet protocol (IP) address, and geographic location. Eleventh, code in the browser (e.g., JavaScript code) and/or installed on the device (104, 106) executing on the computer collects data from the client device 106 may be used. Twelfth, with regard to the user entity device 104 footprint it may include subscriber identity module (SIM), international mobile equipment identity (IMEI), applications on the device, and/or secret keys. Thirteenth, the user entity device 104 footprint may be a derived behavior footprint such as location, habits, walking gait, exercise, and/or how any times the user entity 102 calls their top contacts (e.g., top 5 contacts). Fourteenth, the sequence of events and derived context of normal versus abnormal may also be considered.

Figure 6:
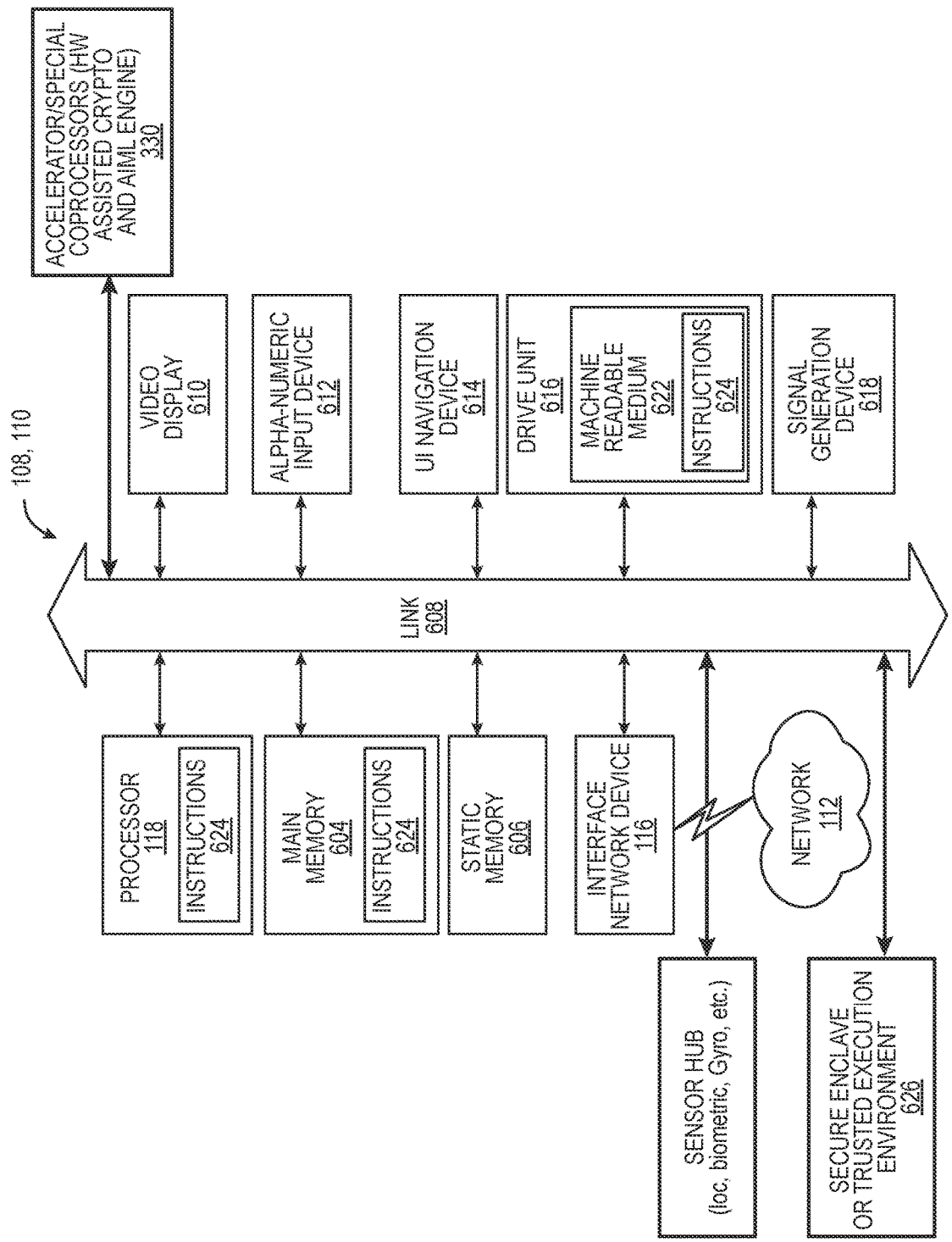
FIG. 6 illustrates a schematic view of details of the smart data hub 108 and/or risk engine 110 which may have a core Artificial Intelligence with Machine Learning (AI/ML) analytics engine.

FIG. 6 is a block diagram illustrating in a more detailed manner the components of smart data hub 108 and risk engine 110. The smart data hub 108 and risk engine 110 are able to read instructions from a machine-readable medium (e.g., a machine-readable storage medium) and perform any one or more of the methodologies discussed herein. Smart data hub 108 and risk engine 110 may be controlled by the system manager (or policy manager) of the network 112, client device 106, and/or secure facility or it may be controlled by an independent party providing a security service to the user entity device 104, client device 106, and/or network 112. Specifically, FIG. 6 shows a diagrammatic representation of the smart data hub 108 and risk engine 110 in the example form of a computer system and within which instructions 624 (e.g., software) for causing the smart data hub 108 and risk engine 110 to perform any one or more of the methodologies discussed herein may be executed. In alternative embodiments, the smart data hub 108 and/or risk engine 110 operates as a standalone device or may be connected (e.g., networked) to other machines. In a networked deployment, the smart data hub 108 and/or risk engine 110 may operate in the capacity of a server machine or a client machine in a server-client network environment, or as a peer machine in a peer-to-peer (or distributed) network environment. The smart data hub 108 and risk engine 110 may be a server computer, a client computer, a user entity computer (PC), a tablet computer, a laptop computer, a netbook, a set-top box (STB), a user entity digital assistant (PDA), a cellular telephone, a smartphone, a web appliance, a network router, a network switch, a network bridge, or any machine capable of executing the instructions 624, sequentially or otherwise, that specify actions to be taken by that server. Further, while only a single smart data hub 108 or risk engine 104 is illustrated, the term "server" shall also be taken to include a collection of servers that individually or jointly execute the instructions 624 to perform any one or more of the methodologies discussed herein.

The smart data hub and/or risk engine 110 includes the processor 118 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The smart data hub and/or risk engine 110 may further include a graphics display 610 (e.g., a plasma display panel (PDP), a light emitting diode (LED) display, a liquid crystal display (LCD), a projector, or a cathode ray tube (CRT)). The smart data hub and/or risk engine 110 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and the network interface device 116.

The storage unit 616 includes a machine-readable medium 622 on which is stored the instructions 624 (e.g., software) embodying any one or more of the methodologies or functions for operation of the system and method 100 described herein. The instructions 624 may also reside, completely or at least partially, within the main memory 604, within the processor 118 (e.g., within the processor's cache memory), or both, during execution thereof by the smart data hub and/or risk engine 110. Accordingly, the main memory 604 and the processor 118 may be considered as machine-readable media. The instructions 624 may be transmitted or received over network 112 via the network interface device 116.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a server (e.g., server), such that the instructions, when executed by one or more processors of the machine (e.g., processor 118), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Substantial variations may be made in accordance with specific requirements to the embodiments disclosed. For example, customized hardware might also be used, and/or particular elements might be implemented in hardware, software (including portable software, such as applets, etc.), or both. For example, as shown in FIG. 6, cognitive engine 330 may be accelerator/special coprocessors (e.g., hardware assisted crypto and AI/ML engine). FIG. 6 also shows a Trusted Execution Environment (or secure enclave) 626 with an engine that allows the application layer to store keys and execute code in a way that the operating system and other application systems cannot access.

FIG. 6 further shows that in alternative embodiments, the computing device can represent some or all of the components of the smart data hub 108 and/or risk engine 110. The computing devices alternatively could function in a fully virtualized environment. A virtual machine is where all hardware is virtual and operation is run over a virtual processor. The benefits of computer virtualization greatly increase the computational efficiency and flexibility of a computing hardware platform. For example, computer virtualization allows multiple virtual computing machines to run on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software running on hardware platform, and one or more virtual machines running on hardware platform by way of virtualization software. Virtualization software is therefore logically interposed between the physical hardware of hardware platform and guest system software running "in" virtual machine. Memory of the hardware platform may store virtualization software and guest system software running in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system—the "host operating system"—such as Windows or Linux to manage system resources. In a hosted virtualization system, the host operating system may be considered as part of virtualization software.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Returning to FIG. 1, user entity 102 identity resolution is often heavily tailored to minimize friction to enable easy enrollment into the primary or secondary digital channels. For example, in mobile and web channels this is often a simple and fast user entity 102 enrollment process that includes a user entity name (e.g., a valid email address) which can be qualified via an out of band notification to complete the baseline enrollment. This out of band notification may be a One Time Password sent to the user entity 102 email address or a link to click to authenticate in a challenge response sequence. When initiating a business relationship between a user entity 102 and a relying party 109 (e.g., a target service provider such as a bank, a tele-communication entity, a credit bureau, DMV, Social Security Agency, or any local, national or global identity issuers), an identity proofing process lifecycle starts with a simple but effective user entity 102 identity resolution which uses the smallest set of attributes possible from the relying party's 109 acquisition population. As long as the relying party 109 can confirm that the user entity 102 can verify that the user identifier (i.e., user entity 102 email) truly belongs to him or her the enrollment process flow sufficiently completes with minimal friction. This frictionless strategy provides some minimal level of protection against fraud from the perspective of preventing a bad actor from acting as a user entity 102. The fraudster may enroll on a new user entity device 104 or browser 105 with an existing legitimate user entity 102 identification or email address who already has a digital channel presence. Note that in order to defeat an Account Take Over (ATO) for an existing registered account owner user entity 102, a key requirement is to prevent a second user entity device 104 or browser 105 to enroll unless an out of band (OOB) verification is initiated and approved, by the original user entity device 104, email, and browser associated with the original registered, claimed identity.

It is important to recognize that while identity resolution has primitive authentication with some initial detection of potentially fraudulent activity, it does not provide a complete and successful identity proofing service. The identity proofing system and method 100 disclosed herein use the following techniques. First, if the account access or transaction is the first occurrence of digital channel enrollment for the user entity 102, then the risk engine 110 and smart data hub 108 need to provide some baseline or minimal predetermined risk score 114 which is a level of confidence score for a business decision. The risk score 114 in the risk engine 110 is used as part of orchestrated policies among the relying party 109, risk engine 110, smart data hub 108, user entity device 104 and/or client device 110 to detect potential behavior deviations from normal and force a user entity device 104 logout or be subject to a stepped up Level of Assurance. Second, not only authentication is required by system and method 100 but also re-authentication may be demanded. Third, when a user entity 102 engages to enroll and attempts to follow through the enrollment with enabling products and services that are privileged and require authentication, methods of verification are established or if perhaps a previously configured digital channel has been enrolled or not, needs to be confirmed. In case of preexisting established methods of authentication at the minimum, Out Of Band (OOB) authentication has been established and may be used.

Note that legacy identity resolution flows have used (and unfortunately keep using) knowledge-based authentication or knowledge-based verification or dynamic knowledge-based verification methods. Knowledge based authentication (KBA) and knowledge based verification (KBV) are often used interchangeably. Both KBA and KBV test a user entity's knowledge by asking a series of multiple choice questions about their life history before granting access to an account with sensitive data or that initiates financial transactions. KBV is typically used with new accounts. It is a means of identity verification. KBA is typically used with existing accounts. It is a means of confirming that the person logging in is the same person that originally created the account. KBA might be a user entity's 102 first grade teacher, first friend, first car, their high school, favorite food, dog, mother's maiden name and the like all of which to resolve the claimed identity both at the user entity 102 enrollment and throughout the lifecycle. While some identity proofing techniques can provide such an option but in general KBA/KBV (including dynamic) are all classified as comprisable. It is highly recommended to use these only in conjunction with other authenticators and using the system and method 100 disclosed herein.

As the relying party 109 proceeds to serve individual user entities 102, they may be subscribed to specific provided services which identity validation such as automated clearing house (ACH), wire transfers, or enrollment for services such as insurance purchase. Using the system and method 100, the relying party 109 can determine the authenticity, validity, and accuracy of identity evidence provided by the user entity 102 in a three-step registration or access process. The system and method 100 may include at least three parts including resolution, validation and verification.

As shown in FIG. 1, the first part of system and method 100 is resolution which is capturing information of the enrolling or accessing user entity 102. User entity 102 will attempt to register (step 150) with a relying party 109 (e.g., corporation, bank, and the like) using a user entity device 104 and/or a client device 106. This starts an active session with the relying party 109 and risk engine 110. In step 152, the user entity 102 will go through the registration process with the relying party 109.

The second part of system and method 100 is validation. Validation is proving the user entity 102 is who he says he is (e.g., using a selfie picture sometimes combined with scan of some sort of identification be it an enterprise or government issued identification). Initially, in step 153, risk engine 110 will monitor attempted accesses to the relying party 109 website. Risk engine 110 will determine whether the user entity 102 is attempting a fraudulent access by a bad actor. The risk engine 110 will look at a plurality of factors which were discussed throughout this disclosure to determine if a bad actor is attempting to access or conduct a with a relying party 109. These factors may include whether the user entity 102 lied about key parameters; there is a lack of a digital fingerprint detected; a java script is missing; the user entity 102 has a bad reputation; whether the user entity device 104 or client device 106 is a rooted device; and/or the user entity 102 is blacklisted. If the risk engine 110 (or smart data hub 108) detect an abnormality at this stage the relying party 109 will be notified to terminate the active session.

Validation will continue with identity proofing of the user entity 102 in step 154. The user entity 102 submits proof of identity that should be genuine and authentic which will verify that the owner of the identity (i.e., user entity 102) which initiated the identity validation is indeed the owner of that identification. Types of identity evidence 156 provided may include an email address, driver license, national identity card, passport, digital identity, KBA, third party social identity (e.g., Facebook, LinkedIn, Google), facial recognition, and fingerprint scans against some centralized and/or decentralized identification provider such as a telephone company, bank, credit bureau, or the like. Knowledge of the user entity device 104 or client device 106 will be captured and go towards identification proofing (e.g., fingerprinting). After providing identity evidence 156, the relying party 109 will determine whether the user entity 102 is new or an established customer.

The third part of the identity proofing system and method 100 is verification. If it is determined in step 158 that the registration is new, the system and method 100 in step 160 will ask the risk engine 110 to conduct the verification. Identity verification is the last step of identity proofing and helps the relying parties 109 to establish a source of truth between the user entity's 102 claimed identity and their true existence versus synthetic identities (or friendly or hostile ATO) using some sort of verification that is classified as either unacceptable, weak, fair, strong or superior according to standards such as the National Institute of Standards and Technology. As shown in FIG. 1, in step 162, the risk engine will contact a plurality of discrete credit and identity aggregator agencies 163 such as Jumio, Hireright, Sterling, IDEMIA, Experian, Idology and LexisNexis in its analysis. The risk engine 109 will determine if these agencies are partners with the risk engine 109 in step 164. If so, the risk engine 109 will be able to obtain the contact information for a verified user entity 102 in step 166. In step 168, the risk engine 109 will contact the real user entity 102 and their user entity device 104 and request a verification. If the agencies are not partners with risk engine 109, in step 170, the risk engine 109 will contact other identity service providers 172 to obtain contact information for a valid user entity 102. Identity service providers 172 are entities like the Department of Motor Vehicles (DMV), telephone companies, Internal Revenue Service (IRS), financial institutions (such as banks), and other types identity services. Alternatively, if the registration in step 158 was not a new user entity 102, the risk engine in step 174 will contact the valid user entity 102 and their user device 104 directly for authentication. By obtaining contact information of the user entity 102 and closing the loop by notifying owner user entity 102 that their identity might be at risk, verification portion confirms that the identity evidence is still valid and associated with the real user entity 102 (e.g., a real live person). At the end of the third step, the verification is completed.

For the second and third parts of the system and method 100, where the relying party 109 has to determine whether the evidence provided is valid and accurate, the risk engine 110 will either provide a risk score 114 or use the NIST's guidelines classify strengths as unacceptable, weak, fair, strong or superior which are defined below. The risk engine 110 will provide either a risk score 114 and/or that classification 113 to the relying party 109.

Unacceptable is no acceptable evidence of identity has been provided. Evidence verification was not performed or failed so the enterprise cannot confirm the applicant is the owner of the claimed identity.

Weak is where identity proofing is not performed, but photographic or biometric evidence is assumed to identify the user entity's 102 identity. The user entity 102 has evidence to support their claimed identity. Personal details are confirmed as valid compared to information held by the relying party 109.

Fair is where the evidence uniquely identifies the user entity 102 through at least one reference number, a physical comparison (e.g., a photograph), biometric factor, and/or KBV. Furthermore, the evidence has been confirmed through cryptographic or proprietary tools and via proprietary knowledge. Evidence is confirmed as valid or genuine using appropriate technologies that approve it is not fraudulent or verified as genuine by trained personnel or using cryptographic security tools.

Strong is when in addition to the fair evidence criteria, the user entity's 102 identity can be confirmed through an authenticator factor bound to their identity.

Superior is the ultimate identity evidence classification which provides high confidence that the user entity 102 is who they claim to be. The relying party 109 will have been able to visually identify the user entity 102 or performed further checks to confirm their identity, and evidence will include digital information that is protected using approved cryptographic or proprietary methods. Evidence has been confirmed to be genuine using appropriate technologies, trained personnel, or cryptographic tools. All personal and evidence details have been validated compared to information held by the enterprise. The user's identity has been confirmed by physical comparison to a photograph or biometric comparison using appropriate technologies. The user's identity has been confirmed by biometric or identity verification comparison using appropriate technologies and services.

The foregoing has outlined rather broadly features and technical advantages of examples in order that the detailed description that follows can be better understood. The foregoing embodiments are presently by way of example only; the scope of the present disclosure is to be limited only by the claims. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Each of the figures is provided for the purpose of illustration and description only and not as a definition of the limits of the claims. No language in the specification should be construed as indicating any non-claimed element as essential to the practice of the invention Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the disclosure. Rather, the preceding description of the embodiments will provide those skilled in the art with an enabling description for implementing embodiments of the disclosure. Various changes may be made in the function and arrangement of elements without departing from the spirit and scope of the disclosure.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The definitions of the words or elements of the claims shall include not only the combination of elements which are literally set forth, but all equivalent structure, material or acts for performing substantially the same function in substantially the same way to obtain substantially the same result.

Neither the Title (set forth at the beginning of the first page of the present application) nor the Abstract (set forth at the end of the present application) is to be taken as limiting in any way as the scope of the disclosed invention(s). The title of the present application and headings of sections provided in the present application are for convenience only, and are not to be taken as limiting the disclosure in any way.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

It should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

The invention claimed is:

1. A method for identity proofing a user entity for allowing for secure access comprising:
    in a resolution step, capturing registration information of the user entity at a relying party and monitoring the user entity by the risk engine during an active session;
    in a first part of a validation step, determining by the risk engine whether the user entity is not a threat actor by reviewing a plurality of egocentric and allocentric factors and if an abnormality is detected, notifying the relying party to terminate the active session;
    in a second part of the validation step, reviewing by the risk engine evidence submitted by the user entity and comparing the evidence to an internal database to determine whether the owner of the identity is the user entity and whether the user entity is a claimed registered identity or a new identity;
    in a verification step, if the user entity is the claimed registered identity, the risk engine will continuously capture contextual and behavioral factors of the user entity at the smart data hub to develop a bio-behavioral model of the user entity through machine learning;
    in the verification step, if the user entity is the new identity, obtaining the user entity contact information from at least one of a plurality of third party identity aggregators and contacting the user entity to obtain a confirmation that the user entity is attempting to register with the relying party and if the user entity is not new, the risk engine already has the contact information for the user entity and contacts the user entity directly through a predetermined out of band method; and sending a risk score from the risk engine to the relying party a classification of the risk determining that the user entity is or is not a threat actor.

2. The method of claim 1 wherein the egocentric and allocentric factors include at least one of the following: whether the user entity lied about key parameters; whether there is a lack of a device or browser fingerprint from the user entity device detected; whether a software service or expected java script is missing; the user entity device has a bad reputation; whether the user entity device is a rooted device; and the user entity is blacklisted.

3. The method of claim 1, wherein identity evidence provided by the user entity includes at least one of the group including: an email address; a driver license; a national identity card; a passport; a digital identity; a knowledge based authentication (KBA); a third party social identity; a facial recognition; and fingerprint scans.

4. The method of claim 1, wherein the classification is unacceptable, weak, fair, strong or superior.

5. The method of claim 1, wherein the plurality of third party identity aggregators are partners with the risk engine.

6. The method of claim 1, further comprising:
when the registration attempt is received of the user entity from the relying party at the risk engine;
contact a user entity device to collect recent contextual and behavioral data of the user entity from the user entity device;
receive the recent contextual and behavioral data of the user entity at the risk engine;
send the recent contextual and behavioral data of the user entity to the smart data hub;
retrieve a bio-behavioral model of the user entity and update with the recent contextual and behavioral data of the user entity to form an updated bio-behavioral model of the user entity;
compare allocentric and egocentric factors of a transaction request with the update bio-behavioral model of the user entity to determine the level of abnormalities associated with the transaction request and determine a risk score; and
send the risk score back to the risk engine.

7. The method of claim 1, wherein transaction request allocentric and egocentric factors include at least one of the group consisting of:
a user entity device model, a user entity device hardware configuration, a user entity device operating system, user entity device applications, a user entity device web browser version, a service set identifier (SSID) of the network WiFi, network information, object classes transferred, screen size, font size, language, user entity habits, speed and style of user entity keyboard entry, mouse strokes, screen touch, adjacent companion mobile device in proximity, biobehavioral data derived from the user entity, walking gait of the user entity, trusted locations of the user entity, haptic-tactic factors derived from hardware sensors embedded inside the device, specialized sensor data captured by the hardware, ambient noise, temperature, discrete movement and location of the mobile device, exercise habits of the user entity, user entity location, and user entity driving, transactions on a mobile device user entity behavior analytics (UBA) services, identification authorization and proofing, secure data access, short message service (SMS), and location based service (LBS) functions.

* * * * *